(12) United States Patent
Matsunami et al.

(10) Patent No.: US 7,912,814 B2
(45) Date of Patent: Mar. 22, 2011

(54) DATA MIGRATION IN STORAGE SYSTEM

(75) Inventors: Naoto Matsunami, Miuragun (JP);
Tetsuya Shirogane, Yokohama (JP);
Naoko Iwami, Sagamihara (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1069 days.

(21) Appl. No.: 11/234,459

(22) Filed: Sep. 23, 2005

(65) Prior Publication Data

US 2006/0020663 A1 Jan. 26, 2006

Related U.S. Application Data

(63) Continuation of application No. 10/879,424, filed on Jun. 28, 2004, now Pat. No. 7,124,143.

(30) Foreign Application Priority Data

May 10, 2004 (JP) .................................. 2004-139306

(51) Int. Cl.
*G06F 17/30* (2006.01)
*G06F 15/16* (2006.01)
(52) U.S. Cl. ........ 707/640; 707/661; 707/696; 707/781; 709/212; 709/225
(58) Field of Classification Search .................. 707/640, 707/661, 696, 781; 709/212, 225
See application file for complete search history.

(56) References Cited

U.S. PATENT DOCUMENTS

| | | | |
|---|---|---|---|
| 5,708,812 A | 1/1998 | Van Dyke et al. | |
| 5,734,859 A | 3/1998 | Yorimitsu | |
| 5,734,922 A | 3/1998 | Hagersten et al. | ............... 712/37 |
| 5,832,274 A | 11/1998 | Cutler et al. | |
| 5,918,249 A | 6/1999 | Cox et al. | ....................... 711/203 |
| 6,108,748 A | 8/2000 | Ofek et al. | |
| 6,115,463 A | 9/2000 | Coulombe et al. | ............ 379/230 |
| 6,230,239 B1 | 5/2001 | Sakaki et al. | ................. 711/112 |
| 6,240,494 B1 | 5/2001 | Nagasawa | |
| 6,336,172 B1 | 1/2002 | Day | |
| 6,356,977 B2 | 3/2002 | Ofek et al. | ..................... 711/112 |
| 6,421,711 B1 | 7/2002 | Blumenau | |

(Continued)

FOREIGN PATENT DOCUMENTS

JP   2000/ 187608   7/2000

(Continued)

OTHER PUBLICATIONS

Knowles, Mike, "Survey of the Storage Evolution", Proceedings of 2003 User. Group Conference, 2003, 6 pages.

(Continued)

*Primary Examiner* — Tim T. Vo
*Assistant Examiner* — Sangwoo Ahn
(74) *Attorney, Agent, or Firm* — Mattingly & Malur, P.C.

(57) ABSTRACT

A storage system includes a first storage node and a second storage node. The first storage node has a first logical unit to which a first target is set, and the second storage node has a second logical unit.

To migrate data from the first logical unit to the second logical unit, the first storage node forwards data stored in the first logical unit to the second storage node, and the second storage node stores the data into the second logical unit. The first storage node also forwards information about the first target to the second storage node, and the second storage node sets a target to the second logical unit using the received information.

11 Claims, 18 Drawing Sheets

U.S. PATENT DOCUMENTS

| | | |
|---|---|---|
| 6,654,830 B1 | 11/2003 | Taylor |
| 6,715,031 B2 | 3/2004 | Camble |
| 6,772,306 B2 | 8/2004 | Suzuki et al. |
| 6,931,410 B2 | 8/2005 | Anderson |
| 6,950,833 B2 | 9/2005 | Costello |
| 6,976,134 B1 * | 12/2005 | Lolayekar et al. ............ 711/148 |
| 2001/0047460 A1 | 11/2001 | Kobayashi |
| 2002/0019922 A1 | 2/2002 | Reuter et al. .................. 711/206 |
| 2002/0112008 A1 | 8/2002 | Christenson |
| 2003/0028555 A1 | 2/2003 | Young et al. .................. 707/204 |
| 2003/0074523 A1 * | 4/2003 | Johnson ........................ 711/112 |
| 2003/0093439 A1 | 5/2003 | Mogi et al. .................... 707/200 |
| 2003/0093442 A1 | 5/2003 | Mogi et al. .................... 707/203 |
| 2003/0110237 A1 | 6/2003 | Kitamura et al. |
| 2003/0115447 A1 | 6/2003 | Pham |
| 2003/0135511 A1 | 7/2003 | Anderson |
| 2003/0140193 A1 | 7/2003 | Acharya |
| 2003/0182330 A1 | 9/2003 | Manley et al. |
| 2004/0049553 A1 | 3/2004 | Iwamura et al. |
| 2004/0068629 A1 | 4/2004 | Fujibayashi et al. |
| 2004/0088483 A1 | 5/2004 | Chatterjee |
| 2004/0117546 A1 | 6/2004 | Mizuno |
| 2004/0139237 A1 | 7/2004 | Rangan |
| 2004/0143642 A1 | 7/2004 | Beckmann |
| 2004/0172512 A1 | 9/2004 | Nakanishi et al. |
| 2004/0225719 A1 | 11/2004 | Kisley |
| 2005/0005062 A1 | 1/2005 | Liu |
| 2005/0010688 A1 | 1/2005 | Murakami |
| 2005/0033878 A1 | 2/2005 | Pangal |
| 2005/0091333 A1 * | 4/2005 | Kobayashi et al. ........... 709/212 |
| 2005/0262102 A1 | 11/2005 | Anderson |

FOREIGN PATENT DOCUMENTS

| | | |
|---|---|---|
| JP | 2003/ 108315 | 4/2003 |

OTHER PUBLICATIONS

Shrimpf, H., "Migration of Processes, Files, and Virtual Devices in the MDX Operating System", ACM SIGOPS Operating Systems Review, vol. 29, Issue 2, Apr. 1995, pp. 70-81.

Banatre, M., "Hiding Distribution in Distributed Systems", Proceedings of the 13$^{th}$ International Conference on Software Engineering, 1991, pp. 189-196.

Leach et al, "The Architecture of an Integrated Local Network", IEEE Journal on Slected Areas in Communications, vol. SAC-1, No. 5, Nov. 1983,pp. 842-857.

Leach et al, "The File System of an Integrated Local Network", Proceedings of the 1985 ACM Computer Science Conference, Mar. 1985, pp. 309-324.

Welch, Brent et al, "Prefex Tables: A Simple Mechanism for Locating Files in a Distributed System", Computer Sience Division Report No. UCB/CSD 86/Computer Sience Division Report No. UCB/CSD 86/261, Oct. 1985, 12 pages.

Tseng, Josh et al, "Internet Storage Name Service (iSNS)", IETF Standard-Working-Draft, CH, vol. ips, No. 22, Feb. 1, 2004, pp. 8-13.

Oct. 8, 2008 foreign Office Action.

* cited by examiner

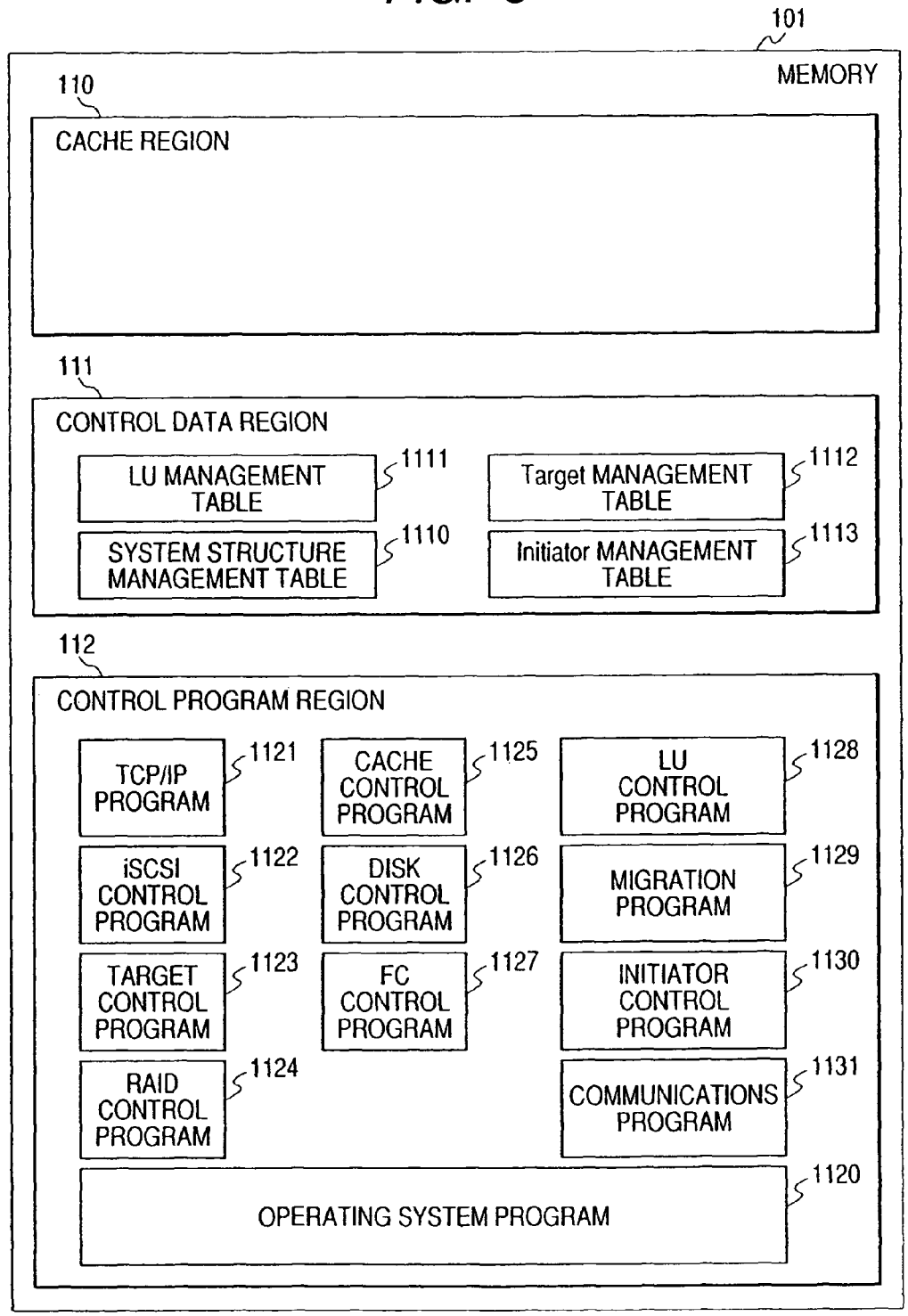

RAID GROUP STRUCTURE

LOGICAL UNIT STRUCTURE

| LU | RG | Start RG LBA | LEN | Initiator | Target |
|---|---|---|---|---|---|
| LU0a | RG0a | 0 | k | Init-a0 | Targ-a0 |
| LU1a | RG0a | k | n | Init-b0 | Targ-a1 |

| LU | RG | Start RG LBA | LEN | Initiator | Target |
|---|---|---|---|---|---|
| LU0b | RG0b | 0 | n | Init-SNa1 | Targ-b0 |

| LU | RG | Start RG LBA | LEN | Initiator | Target |
|---|---|---|---|---|---|
| LU0b | RG0b | 0 | n | Init-b0 | Targ-a1 |

| LU | RG | Start RG LBA | LEN | Initiator | Target |
|---|---|---|---|---|---|
| LU0a | RG0a | 0 | k | Init-a0 | Targ-a0 |

DATA MIGRATION IN STORAGE SYSTEM

CROSS-REFERENCES TO RELATED APPLICATIONS

This application relates to and claims priority from Japanese Patent Application No. JP2004-139306, filed on May 10, 2004, the entire disclosure of which is incorporated herein by reference.

BACKGROUND

The present invention relates to a storage system for use in a computer system.

The data migration technology from a first storage system to a second storage system is described in Patent Document 1.

In Patent Document 1, once connected with a host computer, the second storage system responsively issues a read request to the first storage system so that data in the first storage system is copied into the second storage system. The second storage system is provided with a copy pointer for recoding the completion level of data copying to tell the progress of data migration.

During such data migration, an I/O request issued by the host computer is accepted by the second storage system. In an exemplary case where a read request is issued from the host computer during data migration, the second storage system refers to the copy pointer to see whether data in request is already at hand. If at hand, the second storage system forwards the data to the host computer. If not at hand, the second storage system reads the requested data from the first storage system for transfer to the host computer.

Here, Patent Document 1 is JP-A-2000-187608.

SUMMARY

In Patent Document 1, first, the connection between the first storage system and the host computer is cut off to establish another connection between the host computer and the second storage system. Then, data migration is performed from the first storage system to the second storage system. Once connected to the second storage system, the host computer issues an I/O request to the second storage system.

The concern here is that there is no disclosure in Patent Document 1 about how an access path is changed between the host computer and the corresponding storage system, especially about how to make settings to the second storage system for an access destination of the host computer.

At the time of data migration, if information about data access can be taken over from a migration source to a migration destination, the host computer can be allowed to make access to the migration destination under the same conditions as for the migration source. Accordingly, it is desired such taking-over is realized.

In view of the above, a connection is established over a network among a storage system, a computer, and a name server for managing interrelation between initiators and targets. The storage system includes first and second storage nodes. The first storage node is provided with a first logical unit to which a first target is set. The first target is the one interrelated to a first initiator set to the computer. The second storage node is provided with a second logical unit.

For data migration from the first logical unit to the second logical unit, the first storage node forwards data stored in the first logical unit to the second storage node, and thus received data is then stored in the second logical unit. The first storage node also forwards information about the first target to the second storage node. Using thus received information, the second storage node then makes a target setting to the second logical unit.

Based on an instruction coming from the name server, the computer makes detection if a target interrelated to its initiator is set to the second storage node. If detected as such, the computer issues an access request toward the second logical unit, and the second storage node receives the request.

At the time of data migration, not only data, information about data access can be also migrated from a migration source to a migration destination.

BRIEF DESCRIPTION OF THE DRAWINGS

FIG. 3 is a diagram showing an exemplary structure of memory provided to the storage node;

FIGS. 5A to 5D are all a diagram showing an exemplary structure of an LU management table;

DESCRIPTION OF THE PREFERRED EMBODIMENTS

In the below, exemplary embodiments of the present invention are described. Note that these embodiments are no more than examples, and the present invention is not restricted thereby.

In the accompanying drawings, component names and numbers are each provided with a lower-case alphabetic character such as a, b, or c for component distinction among those plurally provided in the same structure. If no such component distinction is required, no alphabetic character is provided to the component numbers.

First Embodiment

1. Exemplary System Structure (FIG. 1)

Figure 1:
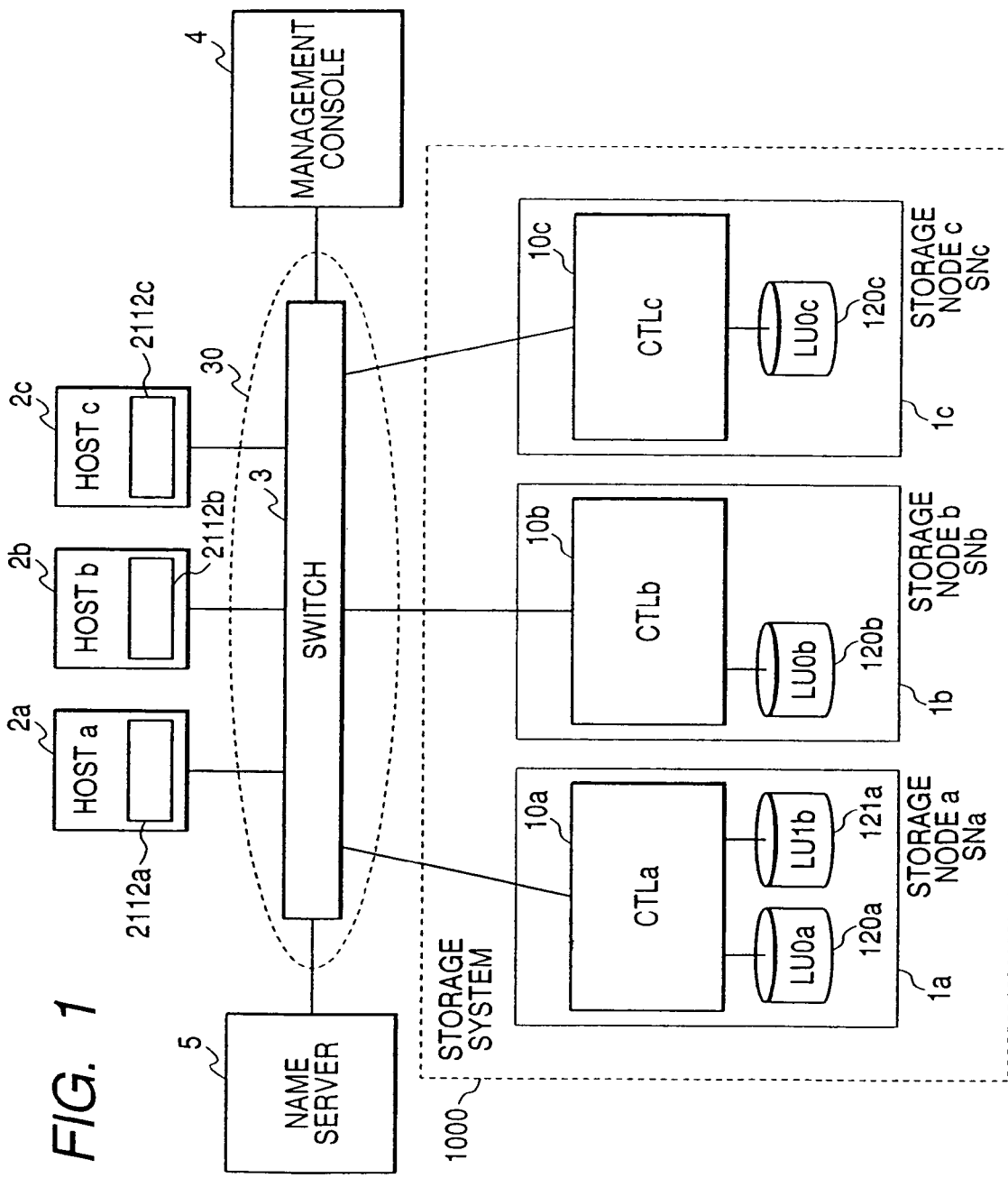
FIG. 1 is a diagram showing an exemplary structure of a computer system in a first embodiment of the present invention.

FIG. 1 is a diagram showing an exemplary system structure in a first embodiment.

A computer system includes: a plurality of storage nodes (in the below, simply referred to as SNs) 1, a plurality of host computers (in the below, hosts) 2, a network 30, a switch 3, a management console 4, and a name server 5. The switch 3 is used for establishing a connection over the network 30 among a plurality of network nodes. The network node is the collective expression including the SNs 1, the hosts 2, the management console 4, the name server 5, and others, all of which are connected to the network 30. The name server 5 is in charge of name management of the SNs 1 and the hosts 2, and their logical connections. The management console 4 is provided for managing a storage system 1000 structured by a plurality of SNs 1. Herein, the network 30 is a generic name for the switch 3 and a line for connecting the switch 3 with the hosts 2, the SNs 1, the management console 4, the name server 5, and others. In FIG. 1, the network 30 is encircled by a dashed line.

The SNs 1 are each provided with a controller (CTL) 10, and a logical unit (LU) 12Xx being a logical disk unit to be accessed by the hosts 2. Here, Xx denotes an identification of the corresponding LU, X is an integer of 0 or larger and x is a small letter of alphabet. The controller 10 exercises control over disks connected to the corresponding SN 1, and executes access requests coming from the hosts 2.

The hosts 2 are each a computer including a network controller for establishing a connection to a CPU, memory, and the network 30. The memory includes an initiator management table 2112, which will be described later.

Similarly to the hosts 2, the management console 4 is a computer including a network controller for establishing a connection to a CPU, memory, and the network 30. The memory stores a structure management program 4122, an LU management table 1111', an initiator management table 2112 or 1113, and a target management table 1112, all of which will be described later. The management console 4 includes input units such as a keyboard and a mouse, and output units such as a display.

2. Exemplary Structure of Storage Node (SN) (FIG. 2)

Figure 2:
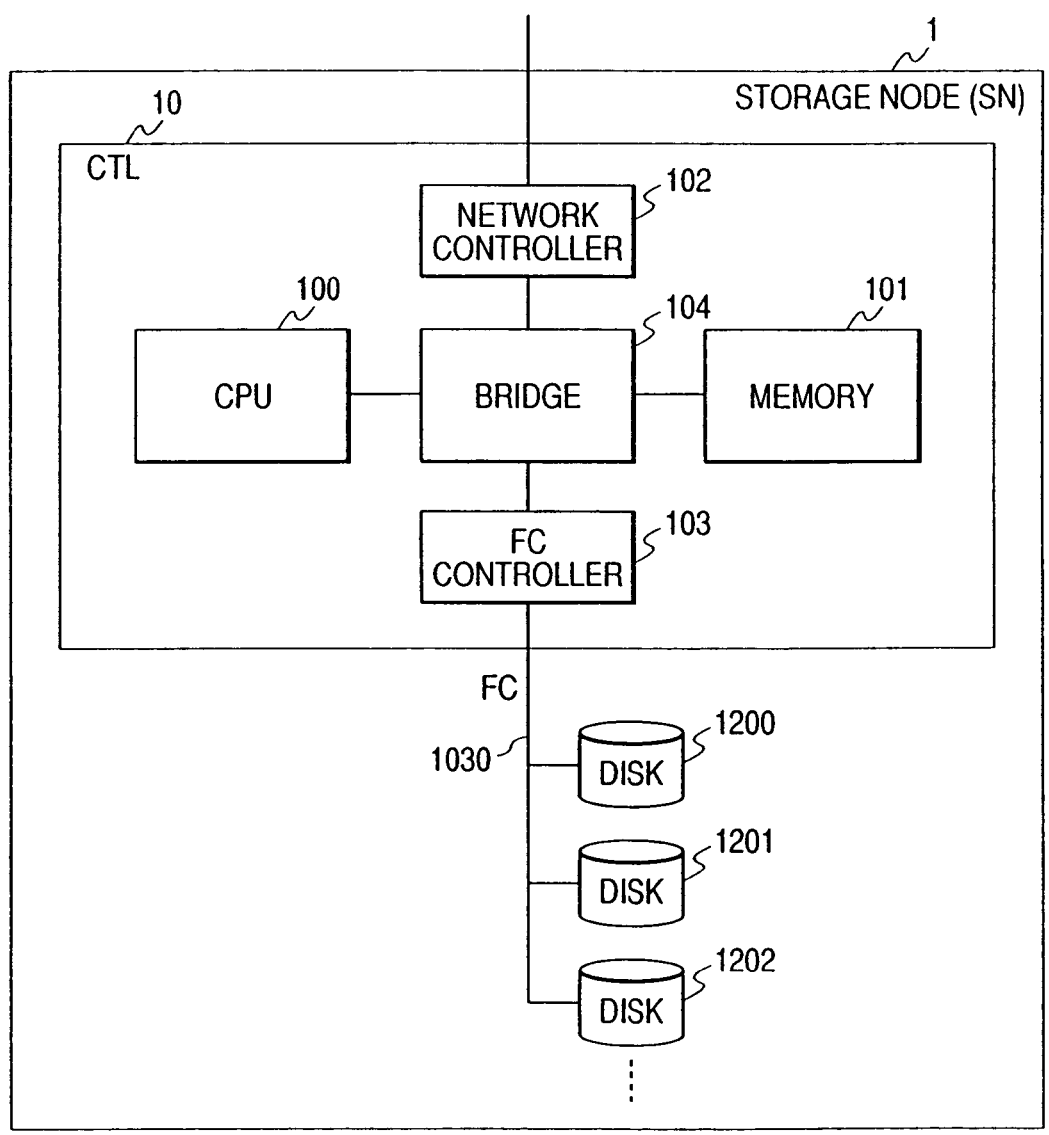
FIG. 2 is a diagram showing an exemplary structure of a storage node.

FIG. 2 is a diagram showing an exemplary hardware structure of the SN 1.

The SN 1 includes the controller (CTL) 10, and a plurality of disks 120y to be connected to the CTL 10 through a Fibre Channel 1030. The CTL 10 exercises control over input/output to/from the disks 120y.

The CTL 10 includes: a CPU 100 exercising control over the SN 1; memory 101; a network controller 102 for establishing a connection to the network 30; an FC controller 103; and a bridge 104. Specifically, the memory 101 stores control programs to be executed by the CPU 100 and control data, and serves as cache for increase the speed of disk access. The FC controller 103 is provided for controlling the Fibre Channel (FC) 1030 to be connected to the disks 120y. The bridge 104 exercises control over data or program transfer between the CPU 100 and the memory 101, data transfer between the network controller 102 and the memory 101, and data transfer between the FC controller 103 and the memory 101.

3. Exemplary Structure of Memory (FIG. 3)

FIG. 3 is a diagram showing an exemplary structure of the memory 101 provided in the SN 1.

The memory 101 is structured by a cache region 110, a control data region 111, and a control program region 112.

To increase the speed of disk access from the hosts, the cache region 110 serves as a disk cache (in the below, simply referred to as cache) for temporarily storing data of the disks 120y or copies thereof.

The control data region 111 is provided for storing various tables and others for reference by the CPU 100 at the time of execution of the control programs. The various tables include a system structure management table 1110, an LU management table 1111, a target management table 1112, and an initiator management table 1113. Specifically, the system structure management table 1110 stores structure information about the storage system 1000 that is structured by a plurality of SNs 1. The LU management table 1111 stores structure information about the LU 12Xx in the SN 1. The target management table 1112 stores a target name (in the below, simply referred to as target) being a logical address provided to the LU 12Xx. The initiator management table 1113 stores an initiator name (in the below, simply refereed to as initiator) being a logical address of an access sources from which the LU 12Xx is accessed.

Note here that the target name or initiator name is exemplified by an iSCSI name in any system using the iSCSI protocol, a WWN (World Wide Name) in any FC systems, and others. The target name is not restrictive thereto as long as being a globally unique identifier assigned to an access destination and showing no change after created until deleted. This is applicable also to the initiator name. Herein, the target address or the initiator address may be used as information for identifying the access destination or the access source. The target address is exemplified by but not restricted to a Destination ID in any system using the FC protocol, and the initiator address is exemplified by but not restricted to a Source ID and others in any system using the FC protocol. The target name and the target address are both information used for identification of address destination, and the initiator name and the initiator address are both information used for identification of address source. Thus, the target address can be an alternative option for the target name, and the initiator address for the initiator name. In consideration thereof, the target name and the target address are hereinafter collectively referred to as "target name", and this is true to the initiator.

The control program region 112 is provided for storing the control programs to be executed by the CPU 100. The control program region 112 stores various programs as follows. That is, an operating system program 1120 serves as a basic program to execute the control programs in the environment; a TCP/IP program 1121 for data transmission and reception over the network 30 using the TCP/IP protocol; an iSCSI control program 1122 for connecting between the hosts 2 and the SNs 1 using the iSCSI protocol; and a target control program 1123 for controlling a target process at the time of access reception from the host 2 being the initiator to the LU 12Xx being the target of the iSCSI. Herein, the target process includes command reception from the host 2, command interpretation after reception, and others. The various programs further include: a RAID control program 1124 for controlling RAID (Redundant Arrays of Inexpensive Disks) structured by a plurality of disks 120y of the SN 1; a cache control program 1125 for management control of the disk cache formed in the cache region 110; a disk control program 1126 for executing a disk control process such as command generation with respect to a single disk 120y; an FC control program 1127 for transmission and reception of command and data with the disk 120y via the FC through control over the FC controller 103; an LU control program 1128 for structuring the LU 12Xx being a logical volume through formation of RAID from the disks 120y; a migration program 1129 for executing a migration process for migrating data of the LU 12Xx among the SNs 1; an initiator control program 1130 for controlling the SN 1 to operate as initiator of iSCSI at the time of migration process to forward data of the LU 12Xx to any other SN 1; and a communications program 1131 for carrying out communications for name management with the name server 5 based on the iSCSI protocol specifications.

In the present embodiment, the network 30 is exemplified as an IP network for connection between the hosts 2 and the SNs 1, the network protocol as the TCP/IP protocol, and the data protocol between the hosts 2 and the SNs 1 as the iSCSI protocol being a block I/O interface. The present invention is not surely restrictive thereto.

4. Exemplary Structure of LU (FIGS. 4A and 4B)

Figure 4A:
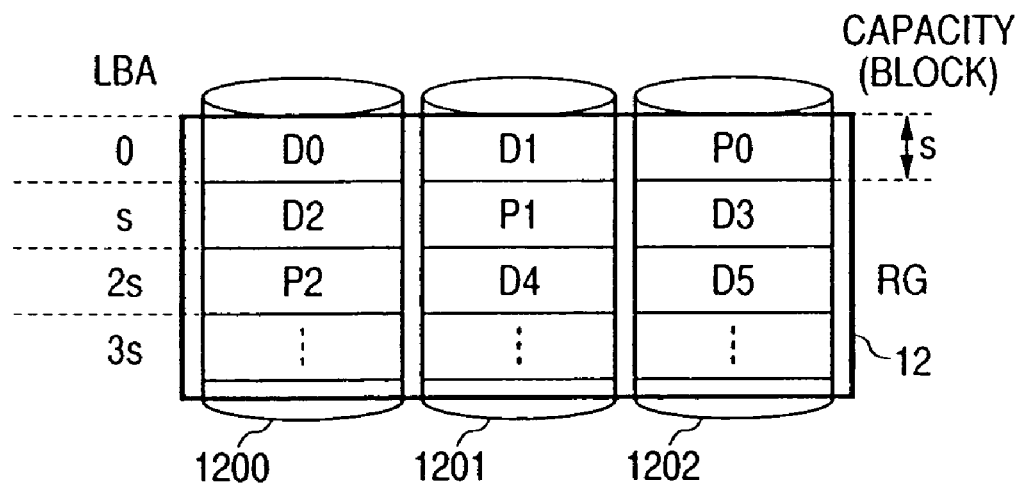
FIGS. 4A and 4B are both a diagram showing an exemplary structure of a logical unit.
Figure 4B:
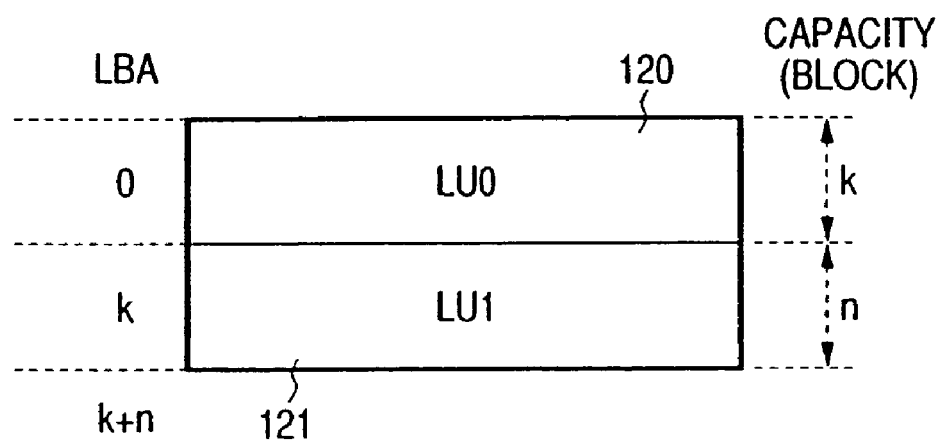

FIGS. 4A and 4B are both a diagram showing an exemplary structure of the LU 12Xx.

The SN 1 in the present embodiment is presumably provided with three disks of 1200, 1201, and 1202. Surely, the number of disks 120y provided to the SN 1 is not restrictive thereto, and any number will do as long as at least one or larger.

FIG. 4A is a diagram showing an exemplary structure of a RAID group (in the below, referred also to as RG).

The three disks of 1200, 1201, and 1202 structure a RAID group 12 of RAID 5 type, and the stripe size thereof is S block. Herein, the block means a logical block defined by the SCSI protocol specifications, and a disk sector or 512 bytes is often defined as a logical block. The block size is not restrictive, and surely any other value will do. In the RAID group 12, data is divided on the basis of S block for placement among other disks adjacent to one another. A stripe string includes three storage regions locating in each different disk. One of such storage regions stores parity data as a result of exclusive OR calculation from data in other two storage regions. That is, $$P0 = D0 + D1 \text{ (where + denotes exclusive OR)} \quad \text{Equation 1}$$

The RAID group (RG) 12 structured as such includes two logical units LU0 and LU1. FIG. 4B is a diagram showing an exemplary structure of a logical unit. The LU0 (120) is a logical unit having the capacity of k block, and the LU1 (121) is a logical unit having the capacity of n block. In the RAID group, the logical block address (in the below, referred to as RG LBA) for the LU0 is in a range from 0 to k-1, and in a range from k to (k+n-1) for the LU1. Once LUs are structured, the LUs are each accessed from the hosts 2 using an LBA local to the corresponding LU (Local LBA) so that each LU can behave as if being an independent disk. That is, the Local LBA for the LU0 (120) has the address starting from 0 to (k-1) being equal to the total capacity −1, and separately therefrom, the Local LBA for the LU1 (121) has the address starting from 0 to (n-1).

5. Exemplary Structure of LU Management Table (FIGS. 5A to 5D)

FIGS. 5A to 5D are all a diagram showing an exemplary structure of the LU management table 1111 stored in the memory 101 of the SN 1. In the table, LU denotes an LU number, and RG denotes identification information of a RAID group having LUs structured therein. Further, Start RG LBA denotes an RG LBA located at the LU head in the RG, LEN denotes the LU capacity (unit of which is block), Initiator denotes an initiator name of any initiator allowed to access the corresponding LU, e.g., initiator set to the host, and Target denotes a target name assigned to the corresponding LU.

FIG. 5A shows an exemplary LU management table 1111a of the SNa (1a). The LU0a is located in the RG0a, and having the Start RG LBA of 0, the capacity of k, the initiator allowed to access thereto is the host (Host a) 2a with the initiator name of Init-a0, and the target name of Targ-a0. Similarly, the LU1a is located in the RG0a, and having the Start RG LBA of k, the capacity of n, the initiator allowed to access thereto is the host (Host b) 2b with the initiator name of Init-b0, and the target name of Targ-a1.

Herein, although the LU and the target have a one-to-one relationship, there may be a case where a plurality of initiators are allowed to access a target. Once the LU management table is added with an initiator name into the column of Initiator, the target control program 1123 responsively allows access only to the LU 12Xx corresponding to the initiator whose initiator name is thus entered. When a plurality of initiators are allowed to access any one specific LU 12Xx, the column of Initiator in the LU management table 1111 is provided with a plurality of entries for registration of a plurality of initiator names. If there is no access limitation for the LU 12Xx, i.e., if every initiator is allowed to access the LU 12Xx, no name is entered into the column of Initiator corresponding to the LU 12Xx (enter NULL). The details of interrelation between the initiator name and the target name are left for later description.

Figure 15A:
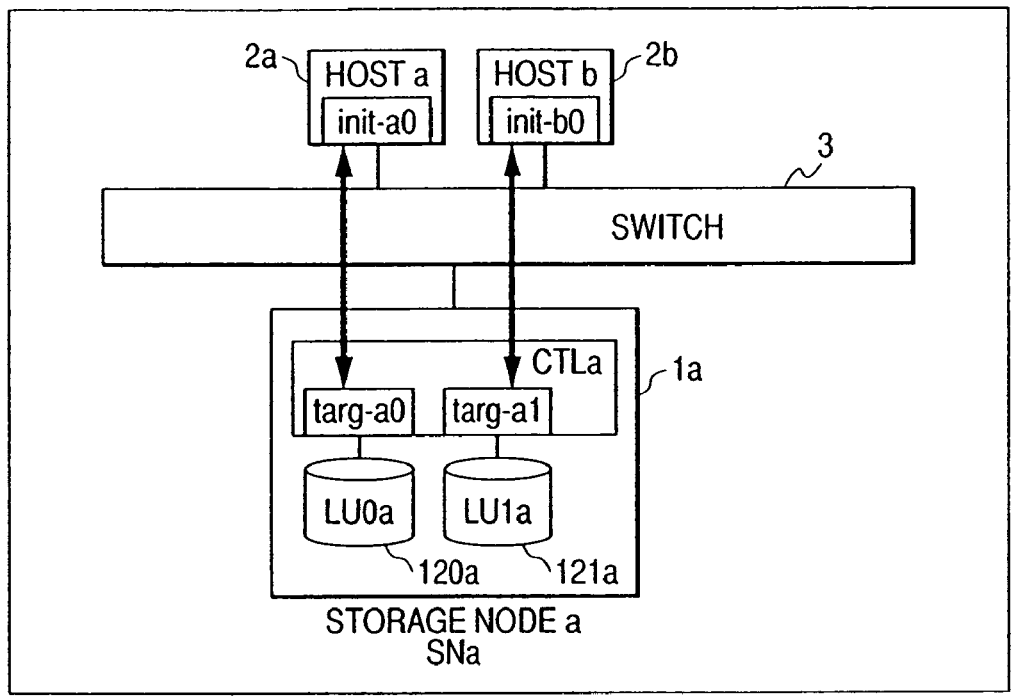
FIG. 15A is a diagram showing an exemplary display screen of a management console 4 having displayed thereon the system structure before data migration.
Figure 15B:
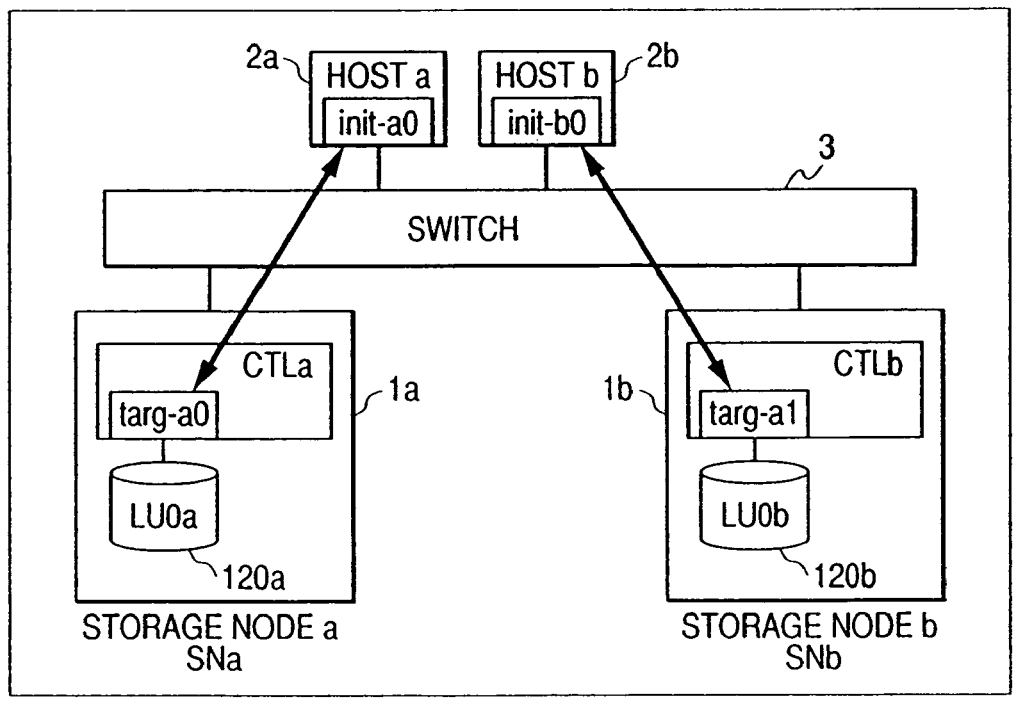
FIG. 15B is a diagram showing another exemplary display screen of the management console 4 having displayed thereon the system structure after data migration.
Figure 15C:
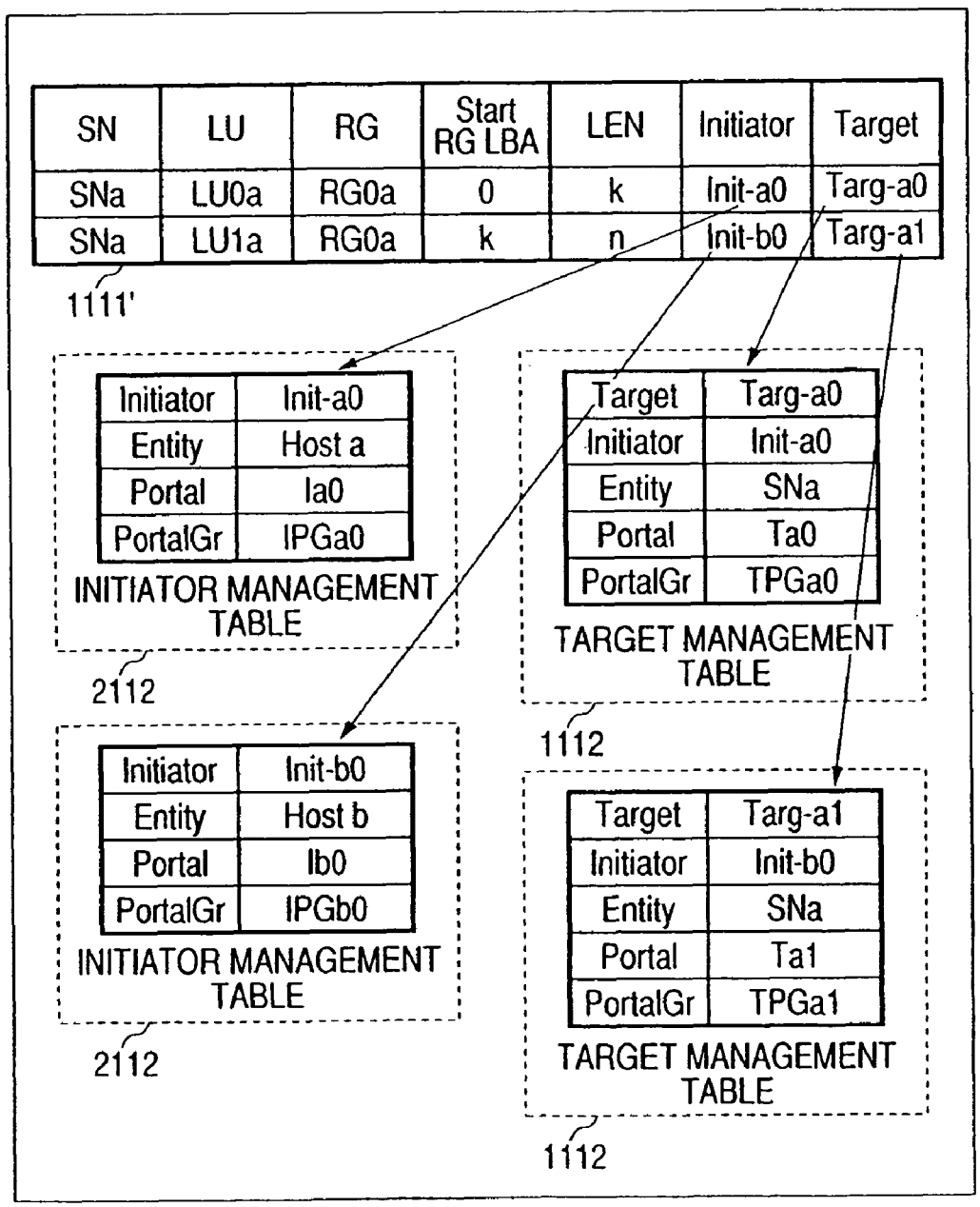
FIG. 15C is a diagram showing still another exemplary display screen of the management console 4 having displayed thereon the interrelation among an LU, a target, and an initiator before data migration.

The management console 4 also includes in the memory the LU management table 1111', which is a combination result of the LU management table 1111 each included in the SNs 1 connected to the network 30. Compared with the LU management table 1111, the LU management table 1111' is additionally provided with identification information for the corresponding SN 1 as shown in FIG. 15C.

6. Exemplary Structure of Name Server (FIG. 6)

Figure 6:
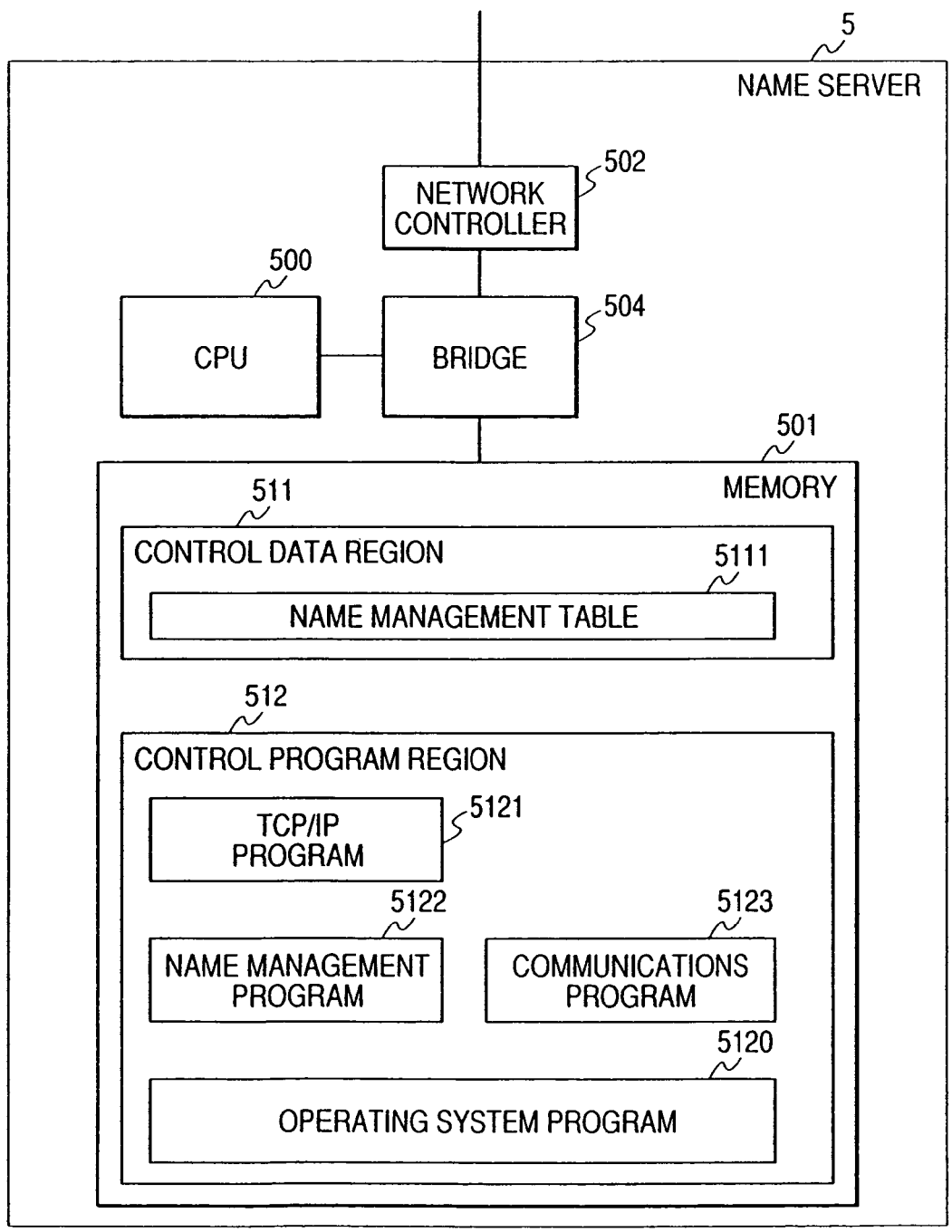
FIG. 6 is a diagram showing an exemplary structure of a name server.

FIG. 6 is a diagram showing an exemplary structure of the name server 5. The name server 5 is provided with: a CPU 500 in charge of control entirely over the name server 5; memory 501 for storing control programs to be executed by the CPU 500 and control data; a network controller 502 for connecting to the network 30; and a bridge 504 exercising control over data or program transfer between the CPU 500 and the memory 501, and data transfer between the network controller 502 and the memory 501.

The memory 501 has a control data region 511, and a control program region 512.

The control data region 511 is provided for storing various tables and others for reference by the CPU 500 when executing the control programs. The control data region 511 stores a name management table 5111 including initiator and target names for iSCSI, and the connection relation between the initiator and the target.

The control program region 512 is provided for storing the control programs to be executed by the CPU 500. The control program region 512 stores various programs as follows. That is, an operating system program 5120 serving as a basic program to execute the control programs in the environment;

a TCP/IP program 5121 for data transmission and reception over the network 30 using the TCP/IP protocol; a name management program 5122 in charge of name management of the iSCSI nodes (i.e., hosts 2 and storage nodes SNs 1) to be connected over the network 30, and controlling the interrelation between the initiators and iSCSI nodes; and a communications program 5123 for carrying out communications for name management of initiators (e.g., hosts 2) and targets (e.g., SNs 1) based on the iSCSI protocol specifications.

In the present embodiment, the name server 5 is exemplified by an iSNS (iSCSI Name Server) of the iSCSI protocol specifications. This is not surely restrictive, and to realize the present embodiment, any other name server specifications can be used to construct a name server.

7. Exemplary Structure of Name Management Table (FIGS. 7A and 7B)

Figure 7A:
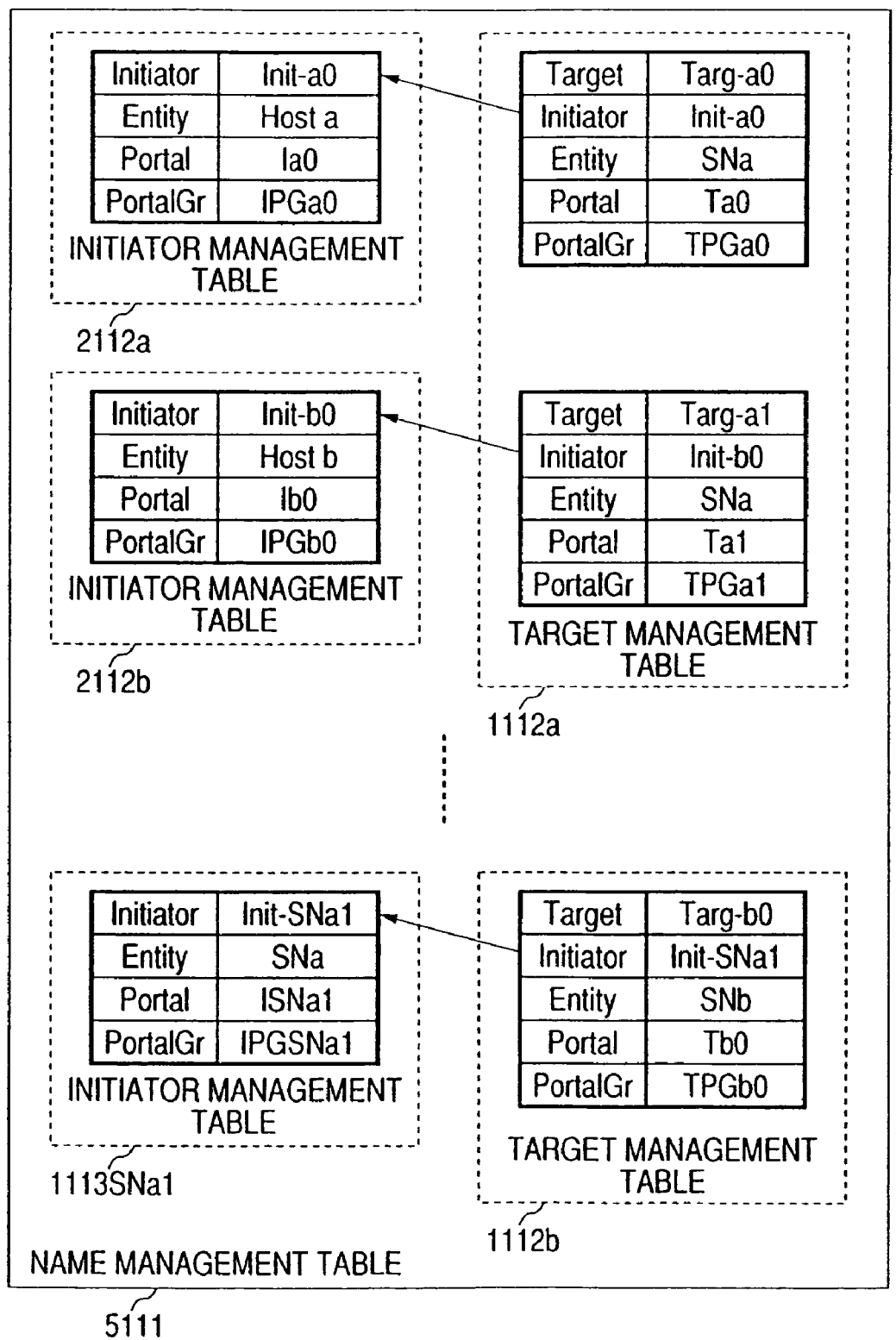
FIG. 7A is a diagram showing an exemplary name management table during data migration.
Figure 7B:
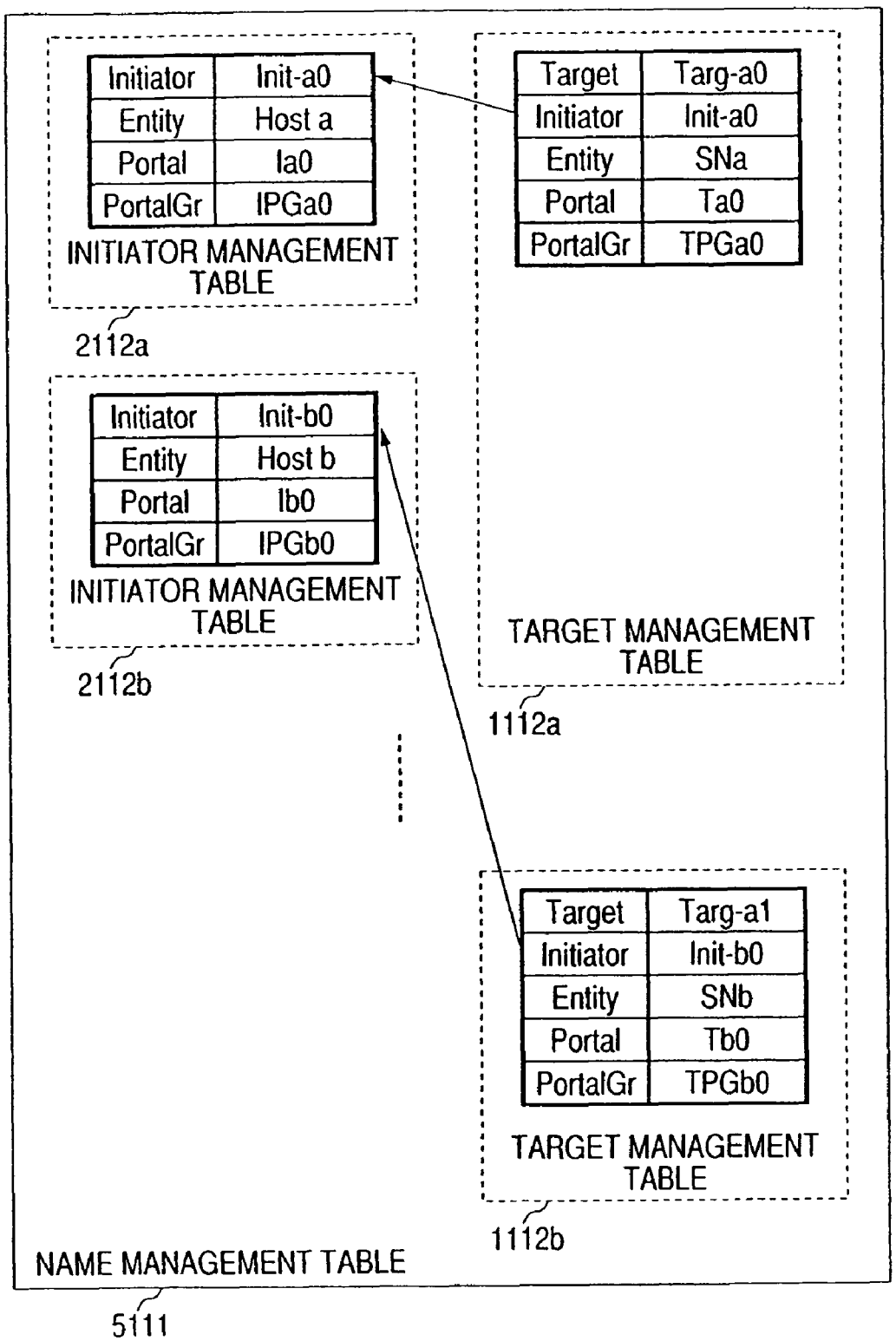
FIG. 7B is a diagram showing another exemplary name management table after data migration.

FIGS. 7A and 7B are both a diagram showing an exemplary name management table 5111 stored in the memory 501 of the name server 5. The name management table 5111 includes the initiator management table (2112 or 1113) and the target management table 1112.

In the initiator management table 2112 of FIGS. 7A and 7B, Initiator denotes an initiator name under the management of an entry of the table, Entity denotes an identifier specifying to which device the initiator belongs, Portal denotes a portal including the initiator, and PortalGr denotes a portal group including the portal.

In the target management table 1112 of FIGS. 7A and 7B, Target denotes a target name under the management of an entry of the table, Initiator denotes an initiator name allowed to access the target, Entity denotes an identifier specifying to which device the target belongs, Portal denotes a portal including the target, and PortalGr denotes a portal group including the portal.

Note that the initiator management table in the name management table 5111 is the same as the initiator management table stored in the memory of the device having the initiator. Similarly, the target management table in the name management table 5111 is the same as the target management table stored in the memory of the device having the target. Further, the management console 4 includes, in the memory, the initiator management table and the target management table being the same as those in the name server 5.

For example, initiator management tables 2112*a* and 2112*b* of FIG. 7A are both an initiator management table for an initiator of the host a (2*a*) or the host b (2*b*). The Host a (2*a*) includes in the memory the initiator management table 2112*a* similar to the one shown in FIG. 7A, and the Host b (2*b*) includes in the memory the initiator management table 2112*b* similar to the one shown in FIG. 7A. Similarly, the initiator management table 1113 of FIG. 7A is an initiator management table for an initiator located in the SNa (1*a*), and the SNa (1*a*) includes in the memory 101 the initiator management table 1113 similar to the one shown in FIG. 7A. Further, target management tables 1112*a* and 1112*b* of FIG. 7A are both a target management table for a target of the SNa (1*a*) or the SNb (1*b*). The SNa (1*a*) includes in the memory 101 the target management table 1112 similar as the target management table 1112*a*, and the SNb (1*b*) includes in the memory 101 a target management table 1112 similar to the target management table 1112*b*.

As is known from the above, the name server 5 uses the name management table 5111 to collectively manage the initiator management tables of the initiators connected to the network 30, and the target management tables of the targets connected to the network 30.

Refer back to FIG. 7A, which exemplarily shows three pairs of initiator and target.

A first pair includes an initiator Init-a0 and a target Targ-a0. The initiator Init-a0 is located in a portal Ia0 of the Host a (2*a*), and belonging to a portal group IPGa0. The target Targ-a0 is located in a portal Ta0 of the SNa (1*a*), and belonging to a portal group TPGa0 to allow the initiator Init-a0 to access thereto.

A second pair includes an initiator Init-b0 and a target Targ-a1. The initiator Init-b0 is located in a portal Ib0 of the Host b (2*b*), and belonging to a portal group IPGb0. The target Targ-a1 is located in a portal Ta1 of the SNa (1*a*), and belonging to a portal group IPGa1 to allow the initiator Init-a0 to access thereto.

A third pair includes an initiator Init-SNa1 and a target Targ-b0. The initiator Init-SNa1 is located in a portal ISNa1 of the SNa (1*a*), and belonging to a portal group IPGSNa1. The target Targ-b0 is located in a portal Tb0 of the SNb (1*b*), and belonging to a portal group IPGb0.

Herein, the portal denotes a logical portal located in the Host 2 or the network controller of the SN 1, and structured by a pair of an IP address of a physical port and a TCP port number. The portal can be plurally provided if anyone specific physical port is provided with a plurality of TCP ports. The portal group includes a plurality of portals as an aggregate to be used as a single communications path. In the below, no mention is made to the portal group except for the group name.

The pairs of initiator and target are made between any initiators and targets connected to the network 30, and managed by the name management table 5111.

8. Exemplary SN Add-In and LU Migration Process

Described now is a process of achieving the load balance among the SNs 1 through addition of a new storage node 1 to the storage system 1000, and through data migration from the LU 12Xx of any existing storage node 1 to the newly-provided SN 1.

Figure 8:
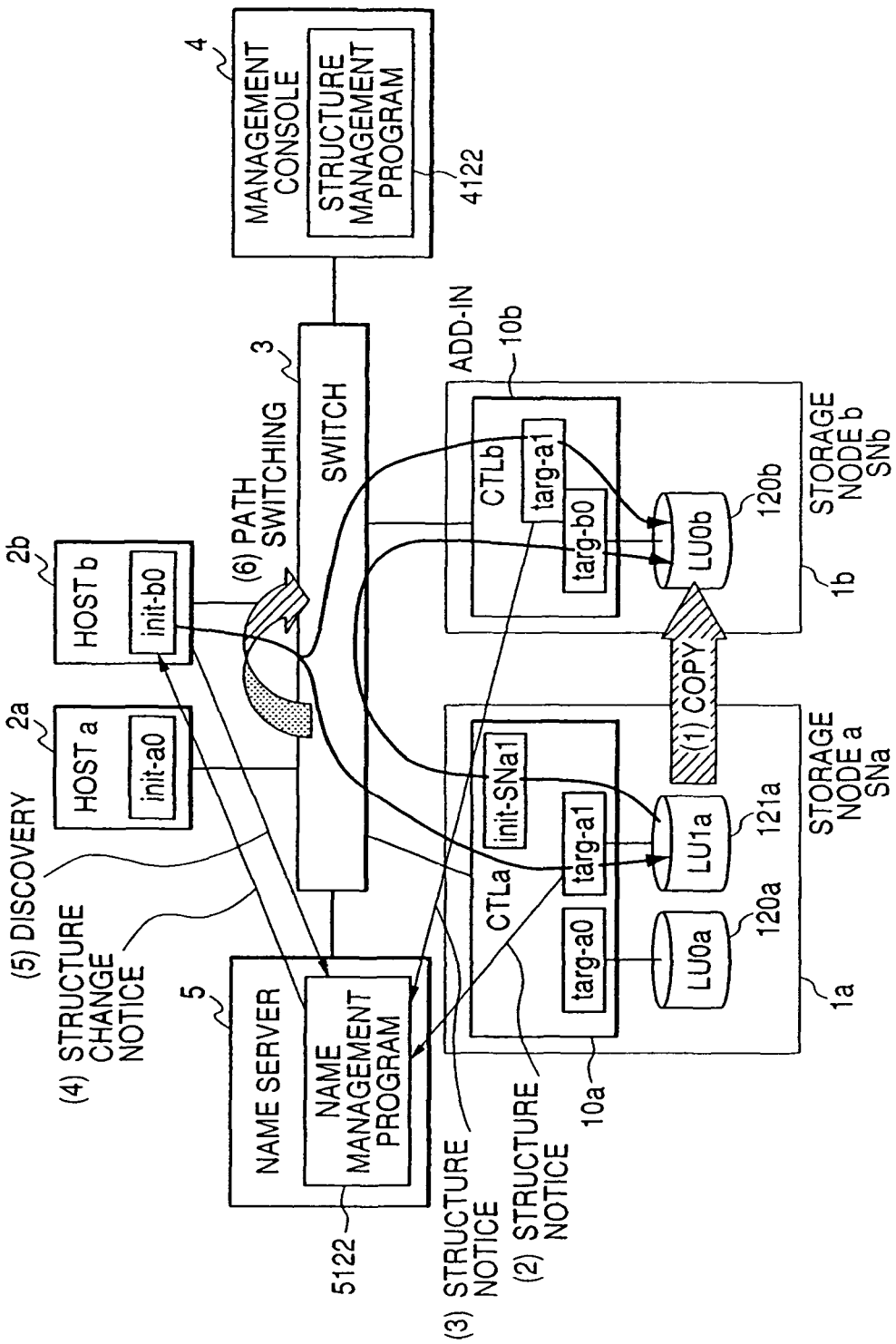
FIG. 8 is a schematic diagram showing an exemplary process of migrating data in a logical unit from a storage node to another.

FIG. 8 is a schematic diagram showing, through addition of a new SN 1 to the storage system 1000, an exemplary process of data migration from the LU 12Xx of any existing SN 1 to the newly-added SN 1. Note that FIG. 8 shows the state halfway through the construction process of the system of FIG. 1.

Assuming here is that, as the first stage, the storage system 1000 does not include the SNb (1*b*) but only the SNa (1*a*), and includes the Host a (2*a*) and Host b (2*b*).

The Host a (2*a*) is making access to an LU0*a* (120*a*) of the SNa (1*a*), and the Host b (2*b*) is making access to an LU1*a* (121*a*) of the SNa (1*a*).

The Host a (2*a*) includes an initiator, which is entered to, as the initiator name of Init-a0, both the initiator management table 2112*a* of the Host a (2*a*) and the name management table 5111 of the name server 5. Similarly, the Host b (2*b*) includes an initiator, which is entered to, as the initiator name of Init-b0, both the initiator management table 2112*b* of the Host b (2*b*) and the name management table 5111 of the name server 5.

The LU0*a* (120*a*) of the SNa (1*a*) is added as the target name of Targ-a0 to the target management table 1112 of the SNa (1*a*) and the name management table 5111 of the name server 5. Also added to the target management table 1112 and the name management table 5111 is Init-a0 as the initiator allowed to access the target Targ-a0. Similarly, the LU1*a* (121*a*) of the SNa (1*a*) is added as the target name of Targ-a1 to the target management table 1112 of the SNa (1*a*) and the name management table 5111 of the name server 5. Also added to the target management table 1112 and the name management table 5111 is Init-b0 as the initiator allowed to access the target of Targ-a1.

As such, two pairs of Init-a0 and Targ-a0, and Init-b0 and Targ-a1 are made. FIG. 7A shows the name management table 5111 under such pair making. The target management table 1112 and the name management table 5111 are added with initiators in accordance with the iSCSI protocol specifications. Assuming here is that the Host a (1a) is already operating under the state accessible to the LU0a (120a), and the Host b (1b) under the state accessible to the LU1a (121a). That is, as shown in FIG. 5A, the LU management table 1111 in the memory 101 of the SNa (1a) includes Targ-a0 as the target name of the LU0a (120a), and Init-a0 as the initiator in the Host a (1a) that is allowed to access the Lu0a (120a). Similarly, the LU management table 1111 includes Targ-a1 as the target name of the LU1a (121a), and Init-b0 as the initiator in the Host b (1b) allowed to access the Lu1a(121a)

Figure 9:
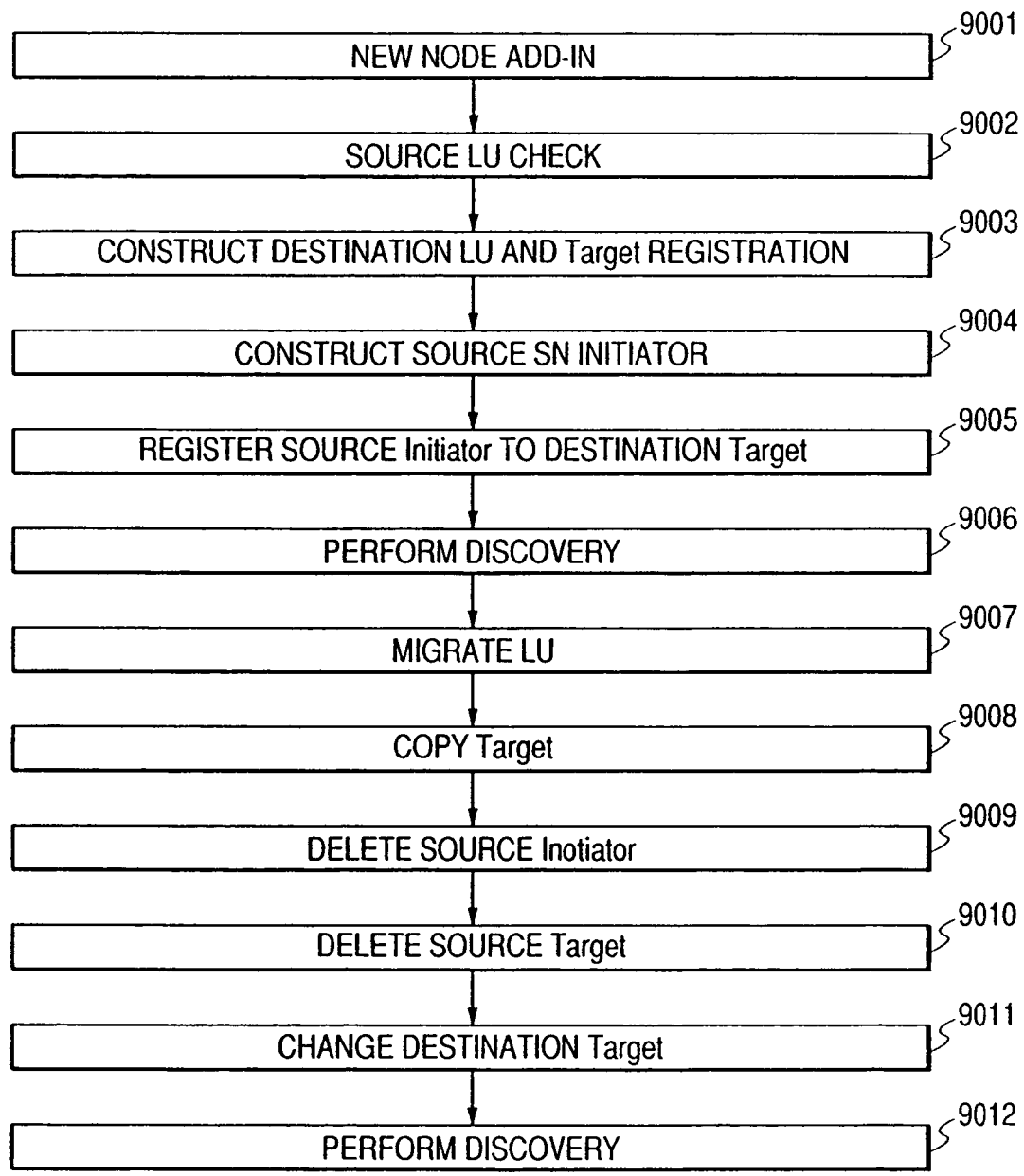
FIG. 9 is a flowchart of an exemplary process of, through addition of a new SN to the storage system of the first embodiment, migrating data from an LU of any existing SN to an LU of the newly-added SN.

By referring to FIGS. 8 and 9, described next is a process of data migration from the LU1a (121a) to the SNb (1b) newly added to the storage system 1000 due to overloaded SNa (1a), for example. FIG. 9 is a flowchart of an exemplary process of, through addition of a new SN 1 to the storage system 1000, migrating data from an LU 12Xx of any existing SN 1 to an LU 12Xx of the newly-added SN 1.

9. Add-In of Storage Node SNb (Step 9001 of FIG. 9)

First, the SNb (1b) is connected to the switch 3 to add the SNb (1b) to the storage system 1000 (step 9001 of FIG. 9). The SNb (1b) is assumed to have a storage region enough for storage of data in the LU1a (121a) of the SNa (1a).

10. Study of Migration Source LU (Step 9002 of FIG. 9)

The CPU of the management console 4 goes through the structure management program 4122 to acquire information about the LU1a (121a), which is the destination LU (step 9002). In the below, when a process is executed by the CPU going through any corresponding program, simply referred to as "the program goes through the process".

To be specific, the structure management program 4122 asks the SNa (1a) for structure information of the LU1a (121a). In response to such a request, the LU control program 1128 of the SNa (1a) refers to the LU management table 1111 to forward the applicable structure information of the LU1a (121a) to the management console 4. The structure information includes information in the LU management table 1111 of the SNa (1a), and information about the RG structure (RAID structure) including the LU1a (121a) structured therein. The structure management program 4122 enters, into the LU management table 1111' stored in its own memory, the information received from the SNa (1a) together with the identification information of the SNa (1a). Then, based on thus received information, the LU1a (121a) is identified as being the LU having the capacity of n block in the RAID group of RAID5 structure.

Herein, the structure management program 4122 may skip step 9002 if the management console 4 already has information about the SNs 1 in the storage system 1000, i.e., information in the LU management table 1111, and the RAID structure of the respective LUs, and if the management console 4 is exercising control over the structure information using its own LU management table 1111'.

11. Construction of Migration Destination LU and Target Registration (Step 9003 of FIG. 9)

Next, the structure management program 4122 of the management console 4 instructs the SNb (1b) to construct an LU0b (120b) having the same capacity as the LU1a (121a) being the migration source to any appropriate RAID group of the newly added SNb (1b). Here, the RAID group considered appropriate may be the one having the same RAID structure as the LU1a (121a).

The structure management program 4122 also instructs the SNb (1b) to set thus newly constructed LU0b (120b) as a target to the portal Tb0 of the physical port and the portal number designated by the SNb (1b), and the Portal group TPGb0.

When the SNb (1b) receives such an instruction, the LU control program 1128 constructs the LU0b (120b) so that a target having the target name of Targ-b0 is created to the portal Tb0 and the portal group TPGb0. Then, as shown in FIG. 5B, the LU management table 1111b is added with Targ-b0 for target name, LU0b for LU, RG0b for RG, 0 for Start RG LBA, and n for LEN.

The communications program 1131 of the SNb (1b) forwards a request to the name server 5 to enter any new target thereto. Upon reception of such a request, the name server 5 registers the target management table 1112b of FIG. 7A to the name management table 5111 as information about the new target. At this point, the target management table 1112b is storing Targ-b0 for target name, SNb for Entity, Tb0 for Portal, and TPGb0 for PortalGroup, and the column of Initiator is vacant, which will be filled in step 9005 that is described later.

The target control program 1123 of the SNb (1b) enters, also to the target management table 1112 in its own memory 101, the same contents as stored in the target management table 1112b in the name management table 5111 of the name server 5, i.e., Targ-b0 for target name, SNb for Entity, Tb0 for Portal, and TPGb0 for PortalGroup (step 9003 of FIG. 9).

In the above manner, by the SNb (1b), the LU0b (120b) is constructed, and the target Targ-b0 is registered. The construction information about the LU0b (120b) and the contents of the target management table 1112 of the target Targ-b0 are forwarded from the SNb (1b) to the structure management program 4122 of the management console 4. In this manner, the information is also registered into the LU management table 1111' and the target management table 1112 of the management console 4. Here, the structure information about the LU0b (120b) includes the RAID structure of the RAID group of the LU0b (120b), and the information of the LU0b (120b) entered to the LU management table of the SNb (1b).

12. Construction of Initiator to Migration Source SN (Step 9004 of FIG. 9)

Next, the structure management program 4122 of the management console 4 instructs the SNa (1a) being the migration source for initiator construction to the portal ISNa1 having the designated physical portal and port number, and the portal group IPGSNa1.

When the SNa (1a) receives such an instruction, the initiator control program 1130 responsively creates an initiator having the initiator name of init-SNa1 to the portal ISNa1, and the portal group IPGSNa1. Then, the communications program 1131 asks the name server 5 to enter the resulting initiator thereto.

Upon reception of such a request, the name server 5 registers to the name management table 5111 an initiator management table 1113SNa1 of FIG. 7A as information about thus newly-constructed initiator. The initiator management table 1113SNa1 already has init-SNa1 for initiator name, SNa for Entity, ISNa1 for Portal, and IPGSNa1 for PortalGroup.

Here, the initiator control program 1130 of the SNa (1a) enters, also to the initiator management table 1113 in its own memory 101, the same contents as stored in the initiator management table 1113SNa1 in the name management table 5111 of the name server 5, i.e., init-SNa1 for initiator name, SNa for Entity, ISNa1 for Portal, and IPGNa1 for Portal-Group.

In the above manner, the SNa (1a) is through with initiator construction, and the contents of the initiator management table 1113 of the initiator init-SNa1 are forwarded from the SNa (1a) to the structure management program 4122 of the management console 4 so as to be entered to the initiator management table 1113 of the management console 4.

13. Initiator Registration of Migration Source SN to Target of Migration Destination SN (Step 9005 of FIG. 9)

Next, the structure management program 4122 of the management console 4 issues an instruction towards the SNb (1b) to provide the initiator init-SNa1 of the SNa (1a) with an access permission for the target Targ-b0.

After the SNb (1b) receives such an instruction, as shown in FIG. 5B, the LU control program 1128 enters an initiator of Init-SNa1 to the LU management table 111b as an initiator for access permission to the target Targ-b0, i.e., the LU0b. Further, the target control program 1123 of the SNb (1b) enters the initiator of Init-SNa1 to the target management table 1112 of the target Targ-b0 as an initiator for access permission to the target Targ-b0.

Then, the SNb (1b) asks the name server 5 to enter an initiator of Init-SNa1 to the target management table 1112b as an initiator allowed to access the target Targ-b0. Here, the target management table 1112b is the one registered into the name management table 5111 in step 9003. In this manner, on the name management table 5111 of the name server 5, the relation between the initiator Init-SNa1 and the target Targ-b0 (LU0b) is established.

As such, the initiator of the migration source SN is successfully entered to the target of the migration destination SN.

Here, also to the LU management table 1111' in the memory and the target management table 1112 of the target Targ-b0, the structure management program 4122 of the management console 4 enters Init-SNa1 as an initiator allowed to access the target Targ-b0.

14. Execution of Discovery (Step 9006 of FIG. 9)

Through registration of a new pair of initiator and target to the name management table 5111 of the name server 5 in step 9005, the initiator-target relation under the management of the name server 5 shows some change. To deal with such a change, the name management program 5122 of the name server 5 issues a State Change Notification (SCN) to the corresponding initiators, i.e., devices such as the hosts 2 and SNs 1 each including an initiator. The initiators received such an SCN go through a process referred to as discovery. During discovery, the initiators each make an inquiry to the name server 5 whether any change has occurred to the targets accessible thereby, i.e., whether the accessible target(s) have been added or deleted. Upon reception of such an inquiry, the name server 5 responsively makes a search of the name management table 5111 based on the initiator name included in the inquiry. After the search, a response is made about the target management information about any target(s) accessible by the inquiring initiator, i.e., information having been registered in the target management table.

In step 9006, as for the initiators located in the hosts 2, no change is observed for the targets accessible by the corresponding initiator. Thus, even if the host 2 goes through discovery, no target change is discovered, and nothing happens.

On the other hand, after the SNa (1a) receives the SCN, the initiator control program 1130 asks the iSCSI control program 1122 to go through discovery. As a result, the iSCSI control program 1122 is notified, by the name server 5, of a new target Targ-b0 corresponding to the initiator Init-SNa1 of the SNa (1a).

In response thereto, the initiator control program 1130 of the SNa (1a) instructs the TCP/IP program 1121 to establish any new TCP connection between the TCP port of the SNa (1a) and the TCP port of the SNb (1b).

Then, the initiator control program 1130 instructs the iSCSI control program 1122 to go through an iSCSI log-in process to establish a new iSCSI session between the portal ISNa1 and the portal Tb0 of the SNb (1b). In this manner, a communications path using iSCSI is established between the SNa (1a) and the SNb (1b).

Next, the initiator control program 1130 of the SNa (1a) issues an iSCSI Inquiry command to the target Targ-b0 of the SNb (1b) to detect an LU0b. This allows the SNa (1a) to access the LU0b (120b) of the SNb (1b).

15. Execution of LU Migration (Step 9007 of FIG. 9)

The structure management program 4122 of the management console 4 issues an instruction toward the SNa (1a) to migrate data in the LU1a (121a) to the LU0b (120b) of the SNb (1b).

Upon reception of such an instruction, the SNa activates the migration program 1129. Using the TCP session established in step 9006, the migration program 1129 communicates with the migration program 1129 of the SNb (1b) under any specific protocol to check the state of LU0b (120b), and whether the LU1a (121a) and the LU0b (120b) are in the same size or not, for example. Then, the SNb (1b) is notified that migration is now started.

Then, the migration program 1129 of the SNa (1a) issues a command to the target control program 1123. In response thereto, the target control program 1123 reads, to the cache 110, data of the LU1a (121a) by any appropriate size. The migration program 1129 issues another command to the initiator control program 1130. In response, the initiator control program 1130 issues an iSCSI writing command to the LU0b (120b) of the SNb (1b) to write the data read to the cache 110. After receiving the writing command and the data, the SNb (1b) stores the data into the cache 110, and then writes the data thus stored in the cache 110 to the LU0b (120b). By repeating such a procedure, the data in the LU1a (121a) is completely copied into the LU0b (120b) ((1) of FIG. 8).

Note here that during such a copying process, the initiator init-b0 of the Host b (2b) keeps accessing the LU1a (121a) of the SNa (1a), i.e., target Targ-a1.

During the copying process, if the SNa (1a) receives from the Host b (2b) the writing command and the writing data to the LU1a (121a), the migration program 1129 of the SNa (1a) writes the writing data to the LU1a (121a), and also forwards the writing data to the LU0b (120b) of the SNb (1b). Then, the SNa (1a) reports the Host b (2b) that the writing process is through, i.e., periodical data writing to the LU0b (120b).

As an alternative manner, storage regions storing different data between the migration source LU1a (121a) and the migration destination LU0b (120b) may be managed by the SNa (1a) using a differential bit map. To be specific, the SNa (1a) makes a registration of a differential bit for any storage region on the differential bit map. Here, the storage region is the one not yet through with data copying from the LU1a (121a) to the LU0b (120b), and the one through with copying but thereafter showing no data coincidence between the LU1a (121a) and the LU0b (120b) due to data update in the LU1a (121a). This update is caused by reception of writing data addressed to the LU1a (121a) from the Host b (2b). Based on the differential bit map, the SNa (1a) may write the data stored in the LU1a (121a) to the LU0b (120b) after the data copying process is through only for the storage region having been registered with the differential bit. In this manner, the writing data received from the Host b (2b) during the copying process can be copied to the LU0b (120b) being the migration destination.

As such, by the time when the copying process is through, the data in the LU1a (121a) and the data in the LU0b (120b) are to be the same ((1) of FIG. 8). This is the end of data copying.

16. Copying of Target (Step 9008 of FIG. 9)

Once the copying process is through, the migration program 1129 of the SNa (1a) instructs the LU control program 1128 to refer to the LU management table 1111 so that the target of the LU1a (121a), i.e., Targ-a1, and the initiator thereof, i.e., Init-b0, are acquired from the LU management table 1111a of FIG. 5A. Then, the migration program 1129 of the SNa (1a) uses any new or existing TCP connection between the SNa (1a) and the SNb (1b), e.g., the TCP connection established in step 9006, to transfer information about thus acquired initiators and targets of the LU1a (121a).

Then, the migration program 1129 of the SNb (1b) issues an instruction to the LU management program 1128. The LU management program 1128 responsively enters, to the LU management table 1111 of the LU0b (120b) of FIG. 5C, Targ-a1 to Target, and Init-b0 to Initiator. More in detail, the LU management program 1128 enters the target and initiator of the LU1a received from the SNa (1a) to the LU management table of the LU0b (120b) to change the target and initiator of the LU0b (120b) to those of the LU1a (121a). In this manner, the data and the access information, i.e., target and initiator, of the LU1a (121a) of the SNa (1a) are taken over by the LU0b (120b) of the SNb (1b), and this is the end of LU migration.

After completion of LU migration as such, a completion notice is forwarded by the SNb (1b) to the SNa (1a), and by the SNa (1a) to the structure management program 4122 of the management console 4. Upon reception of the completion notice, the management console 4 enters, also the its own LU management table 1111', Targ-a1 to the Target of the LU0b (120b), and Init-b0 to the Initiator thereof.

As such, the LU migration process is completed.

17. Deletion of Initiator being Migration Source (Step 9009 of FIG. 9)

After receiving the completion notice of LU migration, the structure management program 4122 of the management console 4 instructs the SNa (1a) to go through initiator deletion. The SNa (1a) responsively instructs the initiator control program 1130 to cut off the connection between the initiator Init-SNa1 and the target Targ-b0 used for data migration, and delete the initiator Init-SNa1. The initiator control program 1130 instructs the iSCSI control program 1122 to cut off the session between the initiator Init-SNa1 and the target Targ-b0. Also, the initiator control program 1130 deletes the initiator management table 1113 about the initiator Init-SNa1 from the memory 101, and instructs the name server 5 to delete the initiator management table 1113SNa1 about the initiator Init-SNa1.

The name server 5 instructed as such accordingly deletes the initiator management table 1113SNa1 having been registered in the name management table 5111.

As such, the initiator Init-SNa1 is deleted by following, in reverse, steps 9004 and 9005 of initiator registration.

The structure management program 4122 of the management console 4 also deletes the initiator management table 1113 of the initiator Init-SNa1 stored in its own memory.

18. Deletion of Migration Source Target (Step 9010 of FIG. 9)

The structure management program 4122 of the management console 4 instructs the SNa (1a) to cut off the session established between the target Targ-a1 set to the LU1a (121a) being the migration source and the initiator Init-b0 located in the Host b (2b), and to delete the target Targ-a1 set to the migration source LU1a (121a).

The LU control program 1128 of the SNa (1a) instructed as such then responsively issues an instruction toward the iSCSI control program 1122 to cut off the session between the initiator Init-b0 of the Host-b (2b) and the target Targ-a1 of the SNa (1a), and the iSCSI program 1122 responsively executes the instruction. The LU control program 1128 deletes, from the LU management table 1111a of FIG. 5A, any entry relating to the LU1a (121a) As a result, the LU management table in the memory 101 of the SNa (1a) looks like an LU management table 1111a of FIG. 5D. Further, the SNa (1a) deletes the entry of Targ-a1 from the target management table 1112 in the memory 101.

The communications program 1131 of the SNa (1a) instructs the name server 5 to delete, also from the name management table 5111, any entry relating to the target Targ-a1 in the target management table 1112. The name server 5 then responsively goes through deletion as instructed ((2) of FIG. 8).

Here, the structure management program 4122 of the management console 4 deletes any entry relating to the LU1a (121a) from the LU management table 1111' in its own memory, and also deletes the target management table relating to the target Targ-a1.

19. Change of Migration Destination Target (Step 9011 of FIG. 9)

The structure management program 4122 of the management console 4 then instructs the SNb (1b) to enter, to the name server 5, the target Targ-a1 having been set to the migration destination LU0b (120b) in step 9008.

The communications program 1131 of the SNb (1b) instructed as such notifies, in a similar manner to step 9003, the name server 5 to change the target name and the initiator name in the target management table 1112b of the name management table 5111 into target: Targ-a1, and initiator: Init-b0 ((3) of FIG. 8). The name management program 5122 of the name server 5 changes the name management table 5111 as notified. The resulting name management table 5111 looks like the one shown in FIG. 7B.

The target control program 1123 of the SNb (1b) also applies the same change to be done by the name server 5. That is, the target management table 1113 stored in the memory 101 of the SNb (1b) is changed similarly. Specifically, in the target management table 1113, target is changed from Targ-b0 to Targ-a1, and initiator is changed from Init-SNa1 to Init-b0 so as to include Target: Targ-a1, Initiator: Init-b0, Entity: SNb, Portal: Tb0, and PortalVr: TPGb0.

The structure management program 4122 of the management console 4 stores, into its own memory, a new target table 1113 of the target Targ-a1, which is including Target: Targ-a1, Initiator: Init-b0, Entity: SNb, Portal: Tb0, and PortalVr: TPGb0.

20. Execution of Discovery (Step 9012 of FIG. 9)

In consideration of the initiator-target relation changed in step 9011, the name management program 5122 of the name server 5 issues a State Change Notification (SCN) to the initiators ((4) of FIG. 8). In response to such an SCN, the initiators each execute discovery to inquire the name server 5 whether any change has occurred to their own accessible targets.

After the Host b (2b) receives the SCN, and after an inquiry is issued to the name server 5 through execution of discovery ((5) of FIG. 8), the Host b (2b) is notified from the name server 5 of management information about the target Targ-a1 relating to the initiator Init-b0. Here, the management information is the one registered in the target management table 1112b of the target Targ-a1. Accordingly, this tells the Host b (2b) that the target Targ-a1 relating to the initiator Init-b0 has moved to the SNb (1b).

Thus, a TCP/IP program (not shown) of the Host b (2b) establishes a new TCP connection between the TCP port of the Host b (2b) and the TCP port of the SNb (1b).

Then, the iSCSI control program (not shown) of the Host b (2b) goes through an iSCSI log-in process to the SNb (1b) to establish a new iSCSI session between the portal Ib0 of the Host b (2b) and the portal Tb0 of the SNb (1b). As a result, a communications path using iSCSI is established between the Host b (2b) and the SNb (1b), and thus path switching is completed ((6) of FIG. 8). Accordingly, hereinafter, if the initiator Init-b0 of the Host b (2b) forwards a writing command and writing data to the target Targ-a1, the SNb (1b) including the target Targ-a1 receives the command and data. The writing data is thus stored in the LU0b (120b) including the target Targ-a1.

In the present embodiment, when data stored in the LU1a (121a) of the SNa (1a) is migrated into the LU0b (120b) of the SNb (1b) being the migration destination, the LU0b (120b) takes over not only the data but also access information. Here, the access information includes target names of targets set to the LU1a (121a) being the migration source, and initiator names of initiators allowed to access the targets. Therefore, the Host b (2b) having gone through discovery acknowledges that the target Targ-a1 corresponding to its initiator init-b0 is changed in location from SNa (1a) to SNb (1b). That is, the Host b (2b) does not acknowledge that the target has been changed. This is because the target name Targ-a1 corresponding to the initiator Init-b0 shows no change even after data migration. Thus, in the present embodiment, as long as the target name Targ-a1 is not changed, even if the location of the target is changed, the data stored in the LU corresponding to the target is guaranteed as not having been changed. That is, the Host 2 can access the same data as long as accessing the target having the same target name.

If the session is temporarily cut off In step 9010 between the initiator Init-b0 of the Host b (2b) and the target Targ-a1 of the SNa (1a), the session from the Host b (2b) is temporarily cut off until a session is established in step 9012 between the initiator Init-b0 of the Host b (2b) and the target Targ-a1 of the SNb (1b). However, the iSCSI command process generally has a retry mechanism, and thus if no command is received by the target, the Host b (2b) continuously retries for duration of 10 seconds. During this duration, if an SCN is issued, if discovery is completed, and if a new session is established between the initiator Init-b0 of the Host b (2b) and the target Targ-a1 of the SNb (1b), the application executed by the Host b (2b) does not acknowledge such a momentarily cut-off. Thus, without interrupting the application of the Host 2, data migration can be performed from any specific SN 1 to another SN 1. In such a manner, without interrupting the application of the Host 2, the SN 1 can be additionally provided, and the load can be distributed among a plurality of SNs 1 connected to the switch 3.

What is better, the programs applying control over layers lower to the operating system of the Host b (2b) such as the TCP/IP program and the iSCSI control program acknowledge that the location of the target Targ-a1 is changed due to data migration as above. The issue here is that, the TCP/IP program and the iSCSI control program establish a TCP connection and an iSCSI session. Thus, the operating system of the Host b (2b) does not necessarily have to acknowledge the location of the target as long as the LU is acknowledged as a logical volume. In view thereof, the operating system of the Host b (2b) and the application program operating thereon do not acknowledge that data migration has been executed. That is, data migration can be favorably performed without causing the operating system of the Host 2 and the application program to notice data migration among the SNs 1.

21. Method for Target Generation

Next, the method for target generation is described in more detail. The target name has to be a unique identifier. To retain such a uniqueness of the target name, an exemplary method is described below.

Assuming here is that a target name is a character string of an appropriate length. An exemplary character string is a combination of various codes and numbers, e.g., a code identifying a manufacturing company, a code identifying a specific organization in the manufacturing company, a code for identifying a storage system, a code for identifying the type of a storage node, a code of a revision of the storage node, a serial number of the storage node, and a sequential number assigned to a target in the storage node. With such a structure, even if any new target is generated in a certain storage node, the newly-generated target can be provided with a target name unique thereto only by incrementing the sequential number.

In the present embodiment above, when data in the LU 12Xx is migrated from a specific SN 1 to another, the LU 12Xx being the migration destination takes over the target name of the LU 12Xx being the migration source. As such, even if the target name is passed between the SNs, the target name remains unique. Thus, the target name can be continuously used by the SN 1 being the migration destination after taken over.

Herein, it is preferable to use nonvolatile memory such as Flash memory for the CTL 10 of the storage node 1 for storing the maximum value of the sequential number used at the time providing a target name to the target in the SN 1. Here, the maximum value of the sequential number is the maximum value of the sequential number already in use. With such a structure, even if power failure or error occurs to the SN 1, the Flash memory has stored the sequential number. Thus, after recovery, the SN 1 can keep generating a series of unique numbers to any new targets set in the SN 1 only by incrementing thus stored sequential number.

Note here that, shown in the above embodiment is the example of taking over a target name provided to any specific LU 12Xx in response to data migration from the LU 12Xx to another. Alternatively, at the time of data migration, the LU 12Xx being the migration destination may be provided with any new target name. If this is the case, to the LU 12Xx being the migration destination, a target name unique to the destination SN 1 can be set using a sequential number of the SN 1, the serial number of the SN 1, a revision code of the SN 1, and others. If any new target name is set to the LU 12Xx being the destination, the LU control program 1128 of the SNb (1b) enters in step 9008 of FIG. 9 thus newly-set target name to the LU management table 1111. Also in step 9011, the SNb (1b) is required to enter the newly-set target name to the name server 5. As a result, at the time of discovery of step 9012, the initiator Init-b0 of the Host b (2b) detects the new target, enabling the initiator to construct a session with the target.

22. Setting of Target

In the above embodiment, shown is the example that the SN 1 generates target or initiator for registration into the name server 5. Instead of the SNs 1 generating the target and initiator as such, the name server 5 may generate those. If this is the case, the SNs 1 issue an instruction for the name server 5 to enter the target and initiator, and in return, the name server 5 forwards the target and initiator back to the corresponding SN 1. Then, the SN 1 makes an entry of the target and initiator received by the name server 5.

23. Display Screen of Management Console (FIG. 15)

FIG. 15 shows an exemplary display screen of the management console 4.

Figure 15D:
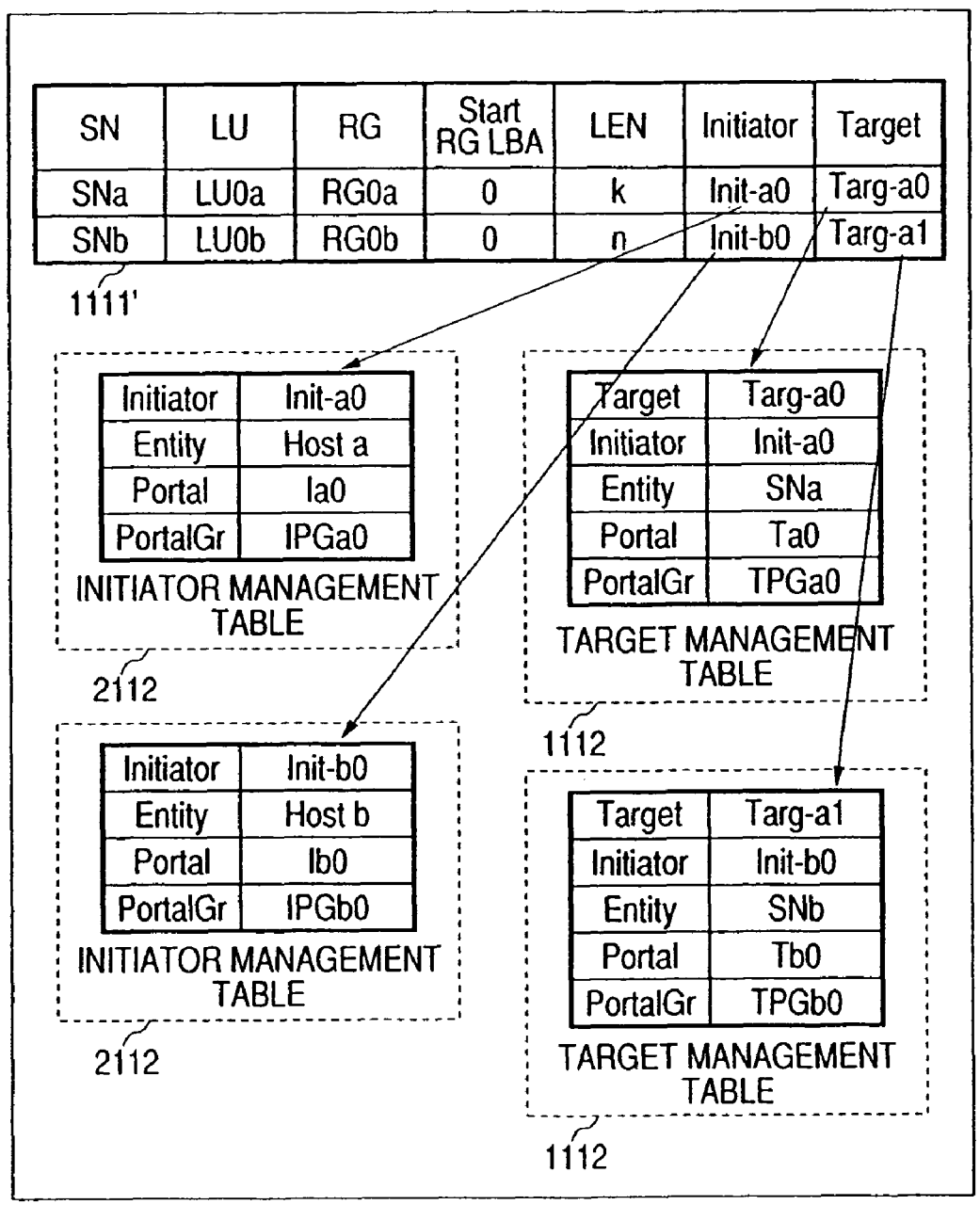
FIG. 15D is a diagram showing still another exemplary display screen of the management console 4 having displayed thereon the interrelation among the LU, the target, and the initiator after data migration.

The structure management program 4122 of the management console 4 displays on its screen the LU management table 1111', the target management table 1112, and the initiator management table 2112 or 1113, all of which are stored in the memory of the management console 4. FIGS. 15C and 15D both show such a display screen. Specifically, FIG. 15C shows an exemplary display screen before data migration, and FIG. 15D shows an exemplary display screen after data migration.

The structure management program 4112 displays on its screen the LU management table 1111', the target management table 1112, the initiator management table 2112 or 1113, and pointers therefor. Thus, a manager using the management consoler 4 can easily grasp the relationship between the LU and the initiator or the target from the information displayed on the display screen.

The structure management program 4112 also displays the system structure on its screen based on the LU management table 1111', the target management table 1112, and the initiator management table 2112 or 1113 stored in the memory of the management console 4. FIGS. 15A and 15B both show such a display screen. Specifically, FIG. 15A shows the system structure before data migration, and FIG. 15B shows the system structure after data migration.

FIGS. 15A and 15B both show a display screen in a case where the LU-b (120b) being the migration destination takes over the target name set to the LU1a (121a) being the migration source. Once data migration is performed, the target name is taken over from the migration source LU to the migration destination LU, causing the target Targ-a1 to be changed in location on the display screen before and after data migration. However, the combination of initiator and target remains the same, i.e., pair of init-a0 and Targ-a0, and pair of init-b0 and Targ-a1. As such, even if data migration is performed between the SNs 1, no change occurs to the combination of initiator and target. Accordingly, this eases the management of initiator sand targets for the manager in the system using the management console 4.

Note here that the information displayed on the display screen is updated every time the LU management table 1111', the target management table 1112, or the initiator management table 2112 or 1113 is updated. Such update is performed responding to an instruction coming from the structure management program to the SNs 1 as described by referring to FIG. 9, or a notification received by the structure management program from the SNs 1 about any change applied to the system structure.

Second Embodiment

Figure 10:
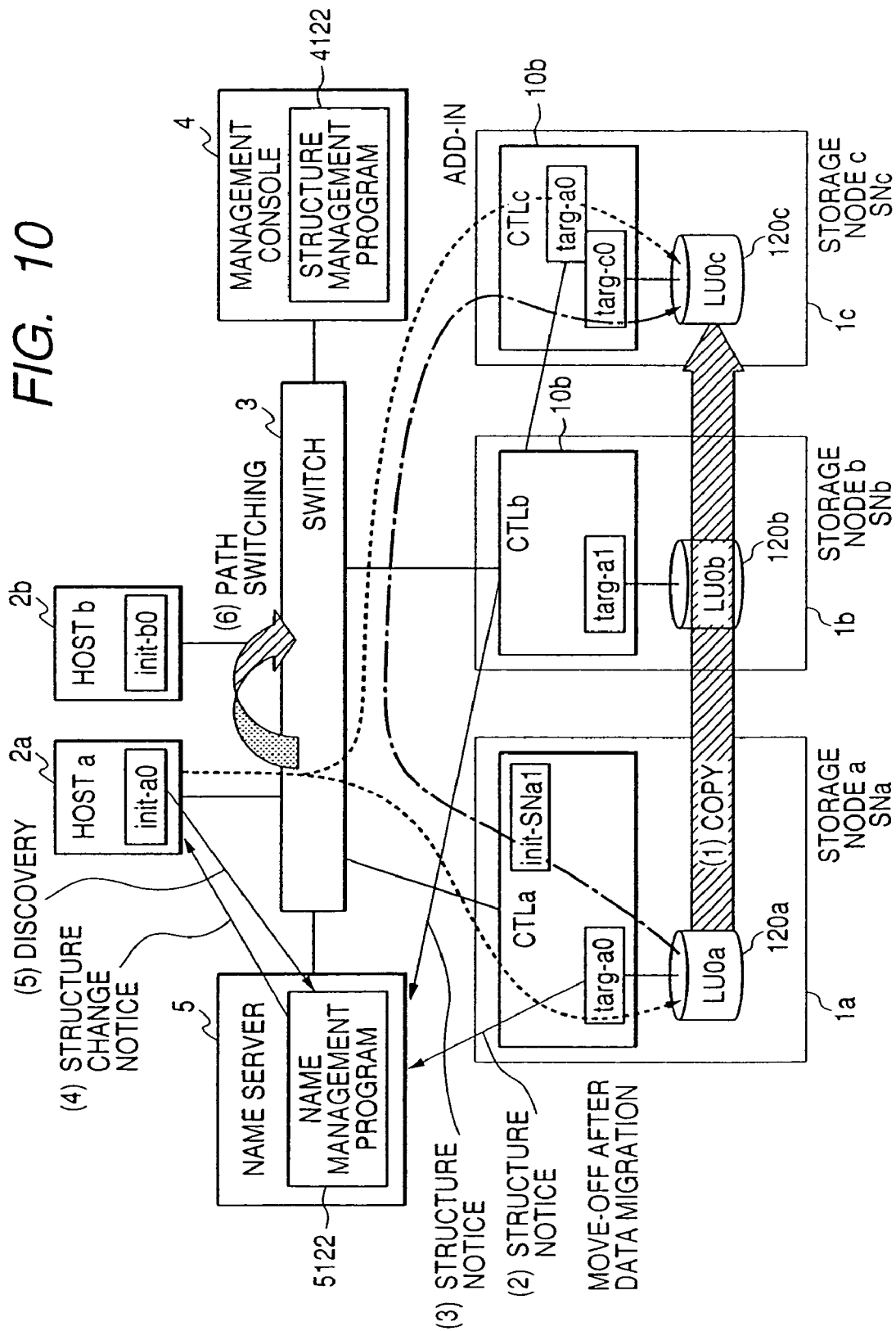
FIG. 10 is a flowchart of an exemplary process of, through addition of a new SN to a network in a second embodiment of the present invention, migrating data from an LU of any existing SN to an LU of the newly-added SN.

Described next is a second embodiment. In the first embodiment, exemplified is the case of migrating data stored in the LU1a (121a) of the SNa (1a) to the SNb (1b), which is newly added. In the second embodiment, as shown in FIG. 10, an SNc (1c) is additionally added to the switch 3, and the LU0a (120a) left in the SNa (1a) is migrated to thus newly-added SNc (1c).

The LU0a (120a) with the target Targ-a0 in the SNa (1a) is connected with the initiator Init-a0 of the Host a (2a). Thus, in the second embodiment, the initiator-target relationship is different from that in the first embodiment, and the discovery and other processes are to be executed by the Host a (2a). The procedure, however, remains the same that the data in the LU0a (120a) of the SNa (1a) is migrated to the LU0c (120c) of the SNc (1c), the LU0c (120c) being the migration destination takes over the target Targ-a0 of the LU0a (120a), and the access path is changed between the initiator Init-a0 and the target Targ-a0.

After completion of such data migration, the SNa (1a) has no LU 12Xx to be accessed by the Hosts 2. Accordingly, the SNa (1a) can be removed from the switch 3, leading to reduction of the SN.

Utilizing the process as such, the SNa (1a) can be replaced to the SNc (1c) without interrupting access from the Hosts 2. More in detail, during the process of changing the access path from the Hosts 2 by migrating the data stored in the LU0a (120a) of the SNa (1a) to the newly-added SNc (1c), the Hosts 2 can be accessible to the data stored in these both LUs. Thus, even if data storage is required for a longer time than the SN lasts, i.e., if data lasts longer than the SN, due to law, for example, data remains available through exchange of any out-of-life storage node 1 instead of replacing the storage system 1000 in its entirety.

According to the present embodiment, data storage can be achieved over a long period of time as long as data lasts while suppressing cost increase required for system replacement without temporary data saving, and without interrupting data access.

Third Embodiment

Figure 11:
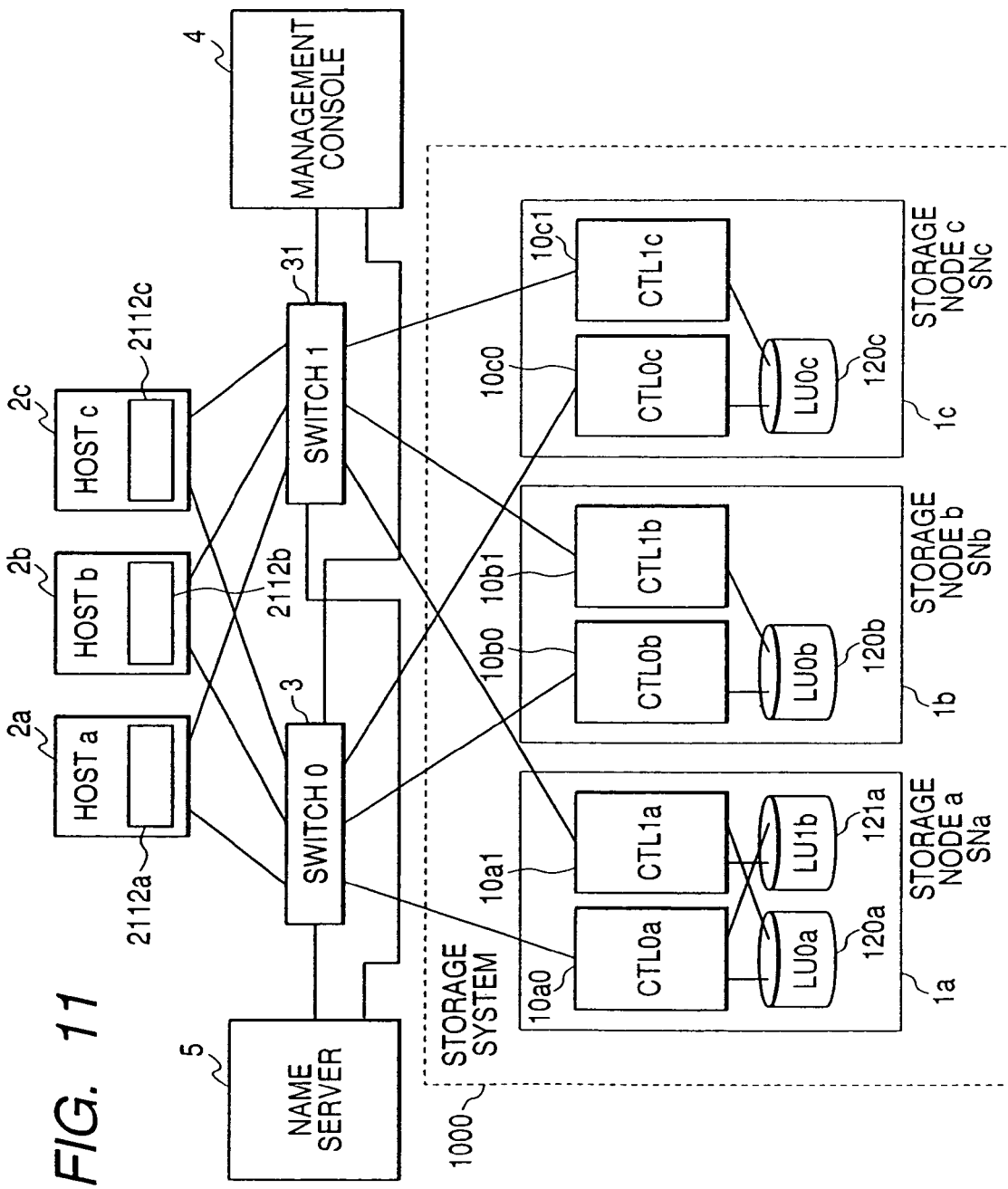
FIG. 11 is a diagram showing an exemplary system structure in a third embodiment of the present invention.

FIG. 11 is a diagram showing another exemplary system structure. A third embodiment has differences from the first and second embodiments that the storage node 1 has two controllers of CTL0 and CTL1, and LU120x are so structured as to be accessible by these two controllers 10. Moreover, the network 30 is provided with two switches of 0(3) and 1(31), and the Hosts 2 and the storage nodes 1 are each connected to these two switches. In the present embodiment, the wiring between the LU120x and CTL10, the wiring between the SN 1 and the switch, and the wiring between the Hosts 2 and the switch are all doubly provided. In such a manner, the resulting storage system can be high in reliability. The method for replacing the storage node 1 and the load distribution through LU migration is the same as that in the first and second embodiments.

Fourth Embodiment

Figure 12:
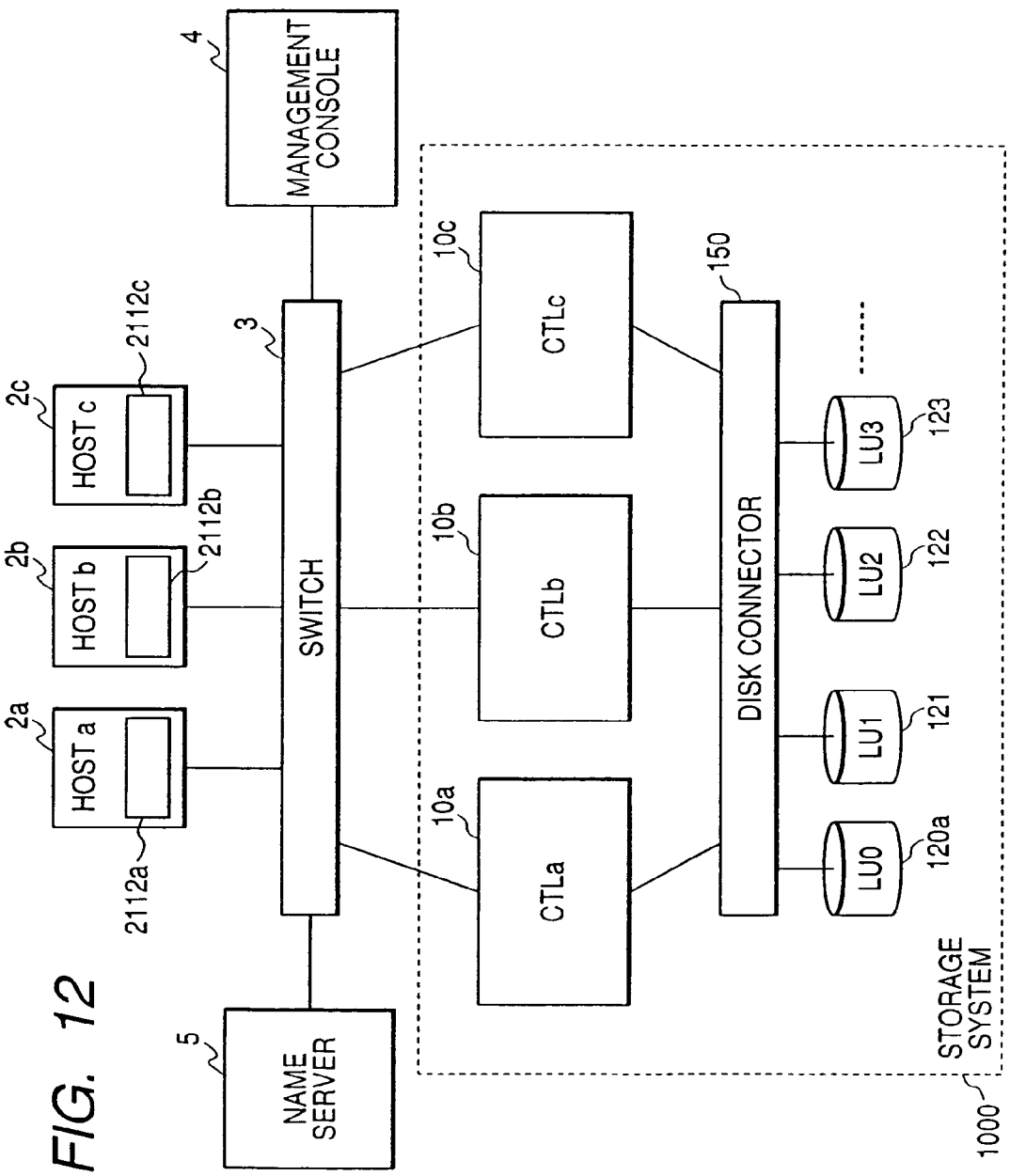
FIG. 12 is a diagram showing an exemplary system structure in a fourth embodiment of the present invention.

FIG. 12 is a diagram showing another exemplary system structure. In the present embodiment, the storage system 1000 is provided with a plurality of CTL 10, and these CTL 10 share the LU 12Xx via a disk connector 150. Add-in and removal of the SNs in the first and second embodiments correspond to add-in and removal of the CTL 10. As an example, a CTLc (10c) may be added as a replacement for the out-of-life CTLa (10a), and after thus newly-added CTLc (10c) takes over the LU 12Xx that was under the control of the CTLa (10a), the CTLa (10a) is removed. At this time, the procedure taken for taking over the LU management information in the LU management table 1111 of the CTLa (10a), for taking over the target in the target management table 1112 of the CTLa (10a), and for changing the access path is executed in the same manner as that in the first and second embodiments. Herein, the CTLs 10 are each connected to the corresponding LU 12Xx via the disk connector 150, thus there is no need for data migration from the LU 12Xx. For example, to take over the LU0 (120a) that was under the control of the CTLa (10a) to the CTLc (10c), the CTLc (10c) is allowed to access the LU0 (120a) through the disk connector 150. Here, exclusive control is to be exercised, and thus the same procedure in the first and second embodiments are to be executed for the CTLc (10c) to take over the LU management information about the LU0 (120a) from the CTLa (10a), take over target information set to the LU (120a), i.e., contents of the target management table 1112 about the target, and others. The procedure can skip the data copying process. In this manner, cost efficiency and system change can be swiftly done to a greater degree.

Fifth Embodiment

Figure 13:
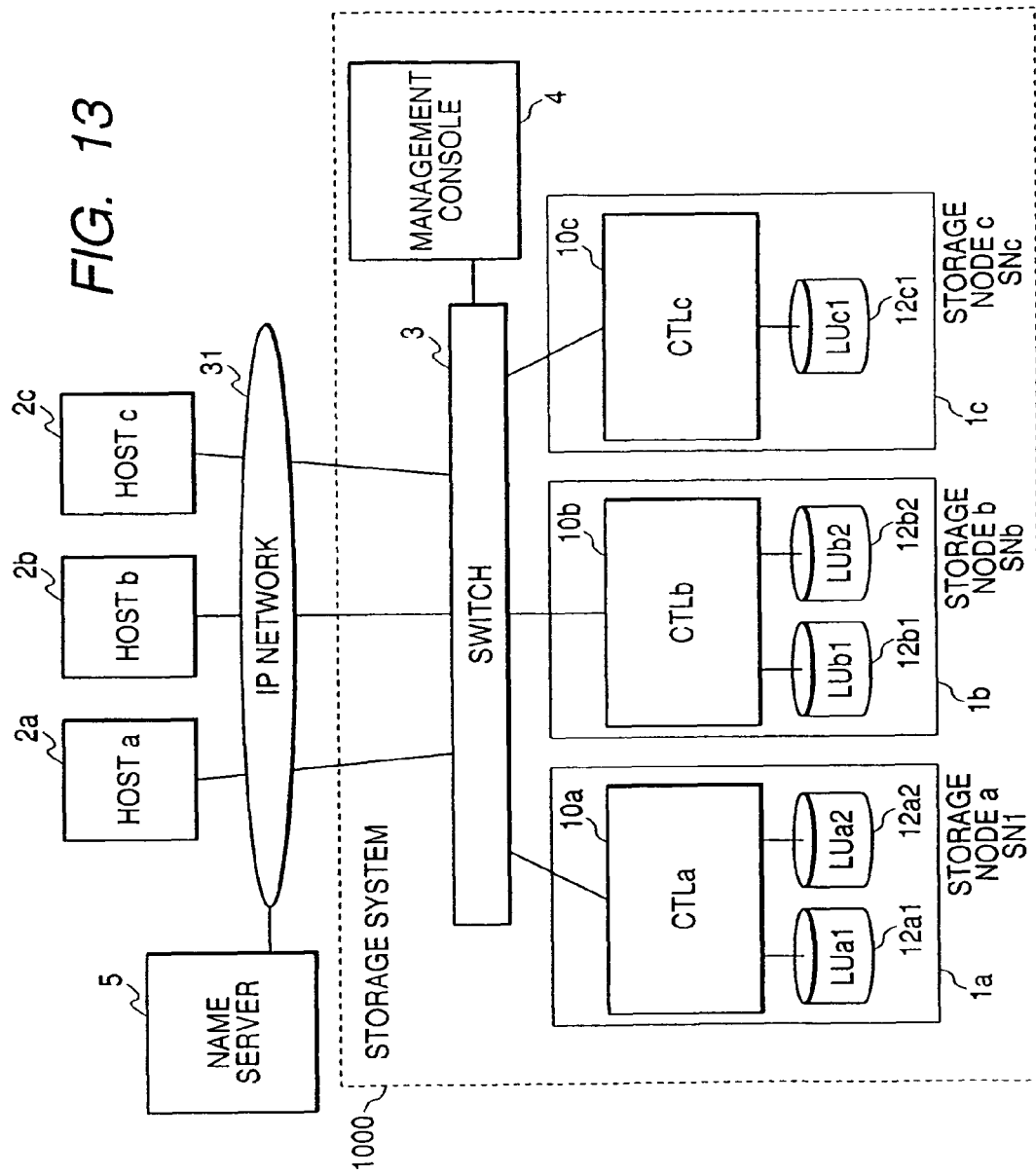
FIG. 13 is a diagram showing an exemplary system structure in a fifth embodiment of the present invention.

FIG. 13 is a diagram showing still another exemplary system structure. In the present embodiment, the switch 3 and the management console 4 are included in the storage system 1000. The switch 3, the management console 4, and the SN 1 are all components of the storage system 1000, and the user is provided those as a set. As a preferred embodiment, these components are so structured as a unit, providing the user with better manageability.

Sixth Embodiment

Figure 14:
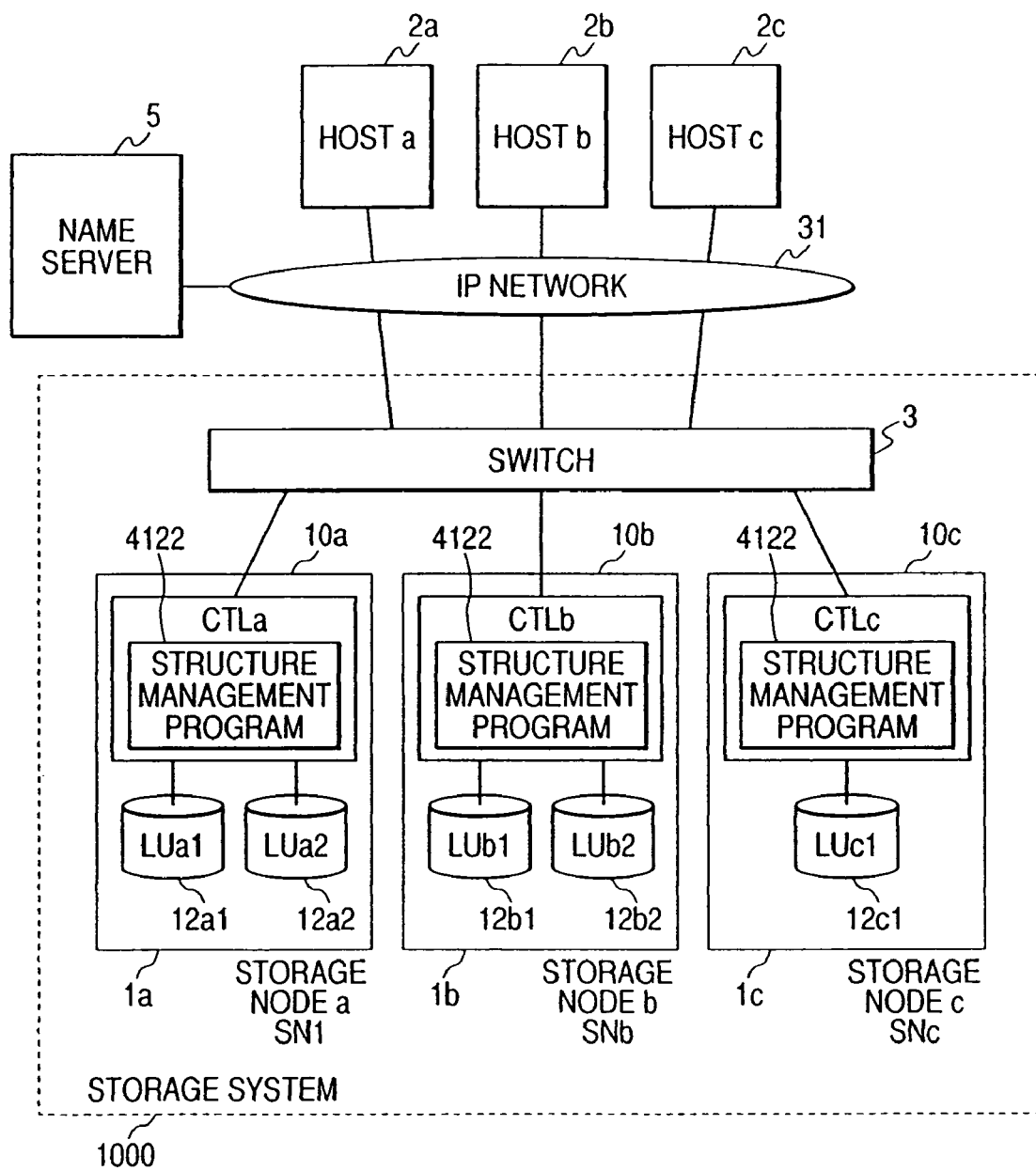
FIG. 14 is a diagram showing an exemplary system structure in a sixth embodiment of the present invention.

FIG. 14 is a diagram showing still another exemplary system structure. In the present embodiment, the management console 4 of FIG. 13 is not provided, and the structure management program 4122 in the management console 4 of the above embodiments is provided to the CTL (10) of the respective storage nodes. Whenever any structure change occurs, the structure management program 4122 communicates with other structure management programs 4122 to see what structure change has occurred. Further, prior to structure change, exclusive control is applied to any needed resources. Such a structure eliminates the management console 4, leading to the storage system with better cost efficiency.

In the above embodiments, the access path from the host is changed after LU data migration is performed. This change may be done in the following order:

1. Migrate LU information (target information and initiator access permission information included)
2. Switching of access path from host to migration destination (migration of target name, and registration change of name server included)
3. LU data migration If this is the case, data access during migration can be handled in the same manner as the background technology. Also in this case, the same effects as the other embodiments can be successfully achieved. Specifically, LU migration can be performed without causing the operating system and the applications of the hosts to notice, which is the characteristics of the present invention.

What is claimed is:

1. A first storage system coupled to a second storage system, a computer and a name server, the first storage system comprising:
a first port coupled to the computer via an IP network;
a plurality of disk drives on which a first volume is constructed; and
a processor, coupled to the first port and the plurality of disk drives, which assigns the first volume to the first port, receives, directly from the second storage system without being passed through the computer, a target name that is used in the second storage system, assigns the target name to a set of the first port and the first volume in the first storage system, and sends information of the target name to the name server when a data migration from the second storage system directly to the first storage system is executed,
wherein the name server notifies the computer of the information of the target name after receiving notification of the target name from the first storage system by using the iSCSI protocol,
wherein the first port accepts an access request from the computer to the first volume after sending the information of the target name to the name server by using an iSCSI protocol if the access request includes the target name, and
wherein the first storage system receives accesses from the computer to the first volume instead of a second volume in the second storage system based on the target name after executing the data migration and after the computer receives notification of the target name from the name server by the iSCSI protocol, whereby neither an operating system of the computer nor an application operating on the computer acknowledges the data migration from the second storage system to the first storage system.

2. A storage system according to claim 1, wherein the information of the target name includes relation information between the target name and the set of the first port and the first volume.

3. A storage system according to claim 2, wherein the processor receives the target name from the second storage system when the data migration is executed.

4. A storage system according to claim 2, wherein the processor receives the target name from the second storage system before the data migration is executed.

5. A storage system according to claim 2, wherein the processor receives the target name from the second storage system after the data migration is executed.

6. A storage system according to claim 1, wherein the processor assigns the target name to the set of the first port and the first volume if the first storage system receives an instruction from the second storage system.

7. A storage system according to claim 6, wherein data to be migrated by the data migration and stored in the first volume is stored in the second volume of the second storage system before execution of the data migration and the target name is assigned to the second volume before execution of the data migration.

8. A storage system according to claim 6, wherein the instruction includes information of a relationship between a port of the computer and the target name.

9. A storage system according to claim 8, wherein the processor sends the information of the target name to the name server by using a State Change Notification command.

10. A storage system according to claim 9, wherein the access request is a log-in command from the computer.

11. A storage system according to claim 10, wherein the first storage system receives the instruction after disconnecting a TCP connection between the computer and the second storage system.

* * * * *